US007775881B2

(12) United States Patent
Griswold et al.

(10) Patent No.: US 7,775,881 B2
(45) Date of Patent: Aug. 17, 2010

(54) GAMING APPARATUS HAVING A CONFIGURABLE CONTROL PANEL

(75) Inventors: Chauncey W. Griswold, Reno, NV (US); Harold E. Mattice, Gardnerville, NV (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 1031 days.

(21) Appl. No.: 10/662,755

(22) Filed: Sep. 15, 2003

(65) Prior Publication Data

US 2005/0059458 A1 Mar. 17, 2005

(51) Int. Cl.
*A63F 13/00* (2006.01)

(52) U.S. Cl. .............................. 463/31; 463/16; 463/40; 463/42; 463/46

(58) Field of Classification Search ............. 463/16–20, 463/31, 40–42, 46
See application file for complete search history.

(56) References Cited

U.S. PATENT DOCUMENTS

| | | | | |
|---|---|---|---|---|
| 3,757,322 | A | 9/1973 | Barkan et al. | 345/174 |
| 4,085,302 | A | 4/1978 | Zenk et al. | 200/5 A |
| 4,224,615 | A | 9/1980 | Penz | 345/174 |
| 4,825,212 | A * | 4/1989 | Adler et al. | 345/177 |
| 4,891,508 | A | 1/1990 | Campbell | |
| 5,239,227 | A | 8/1993 | Kikinis | |
| 5,342,047 | A | 8/1994 | Heidel et al. | |
| 5,376,946 | A | 12/1994 | Mikan | |
| 5,515,045 | A | 5/1996 | Tak | |
| 5,580,310 | A | 12/1996 | Orus et al. | |
| 5,584,054 | A | 12/1996 | Tyneski et al. | |

(Continued)

FOREIGN PATENT DOCUMENTS

AU 733239 7/2000

(Continued)

OTHER PUBLICATIONS

"The IGT Experience: Slot Line Special Show Edition 2002/2003," Global Gaming Expo G2E 2002, Las Vegas Convention Center, Sep. 17-19, 2002, pp. 1-28.

(Continued)

*Primary Examiner*—James S. McClellan
*Assistant Examiner*—Sunit Pandya
(74) *Attorney, Agent, or Firm*—Weaver Austin Villeneuve & Sampson LLP

(57) ABSTRACT

A gaming method for facilitating game play via a gaming apparatus is provided. The gaming apparatus may include a value input device, a first display unit, and a configurable control panel unit. The configurable control panel unit may include a second display unit and a touch screen unit associated with the second display unit. A value input may be received from a player via the value input device, and the first display unit may be caused to display a first game display relating to one of the following games: poker, blackjack, slots, keno or bingo. One of a plurality of player input displays may be selected, and the second display unit may be caused to display the selected one of the plurality of player input displays. Player input data associated with the selected one of the plurality of player input displays may be received via the touch screen unit, and a value payout associated with an outcome of the game may be determined.

68 Claims, 19 Drawing Sheets

U.S. PATENT DOCUMENTS

| | | | | |
|---|---|---|---|---|
| 5,598,527 | A * | 1/1997 | Debrus et al. | 345/173 |
| 5,634,080 | A | 5/1997 | Kikinis et al. | |
| 5,643,086 | A | 7/1997 | Alcorn et al. | |
| 5,680,160 | A | 10/1997 | LaPointe | 345/173 |
| 5,788,573 | A | 8/1998 | Baerlocher et al. | 463/16 |
| 5,807,172 | A | 9/1998 | Piechowiak | |
| 5,816,918 | A | 10/1998 | Kelly et al. | |
| 5,887,995 | A | 3/1999 | Holehan | |
| 5,909,211 | A | 6/1999 | Combs et al. | 345/175 |
| 5,929,474 | A | 7/1999 | Huang et al. | 257/292 |
| 5,951,397 | A | 9/1999 | Dickinson | |
| 5,965,907 | A | 10/1999 | Huang et al. | 257/89 |
| 5,977,704 | A | 11/1999 | Shi et al. | 315/504 |
| 6,002,206 | A | 12/1999 | Harrison et al. | 313/506 |
| 6,011,554 | A | 1/2000 | King et al. | 715/811 |
| 6,027,115 | A | 2/2000 | Griswold et al. | 273/143 R |
| 6,028,271 | A | 2/2000 | Gillespie et al. | 178/18.01 |
| 6,033,307 | A | 3/2000 | Vancura | |
| 6,067,074 | A | 5/2000 | Lueders | |
| 6,068,552 | A | 5/2000 | Walker et al. | |
| 6,072,475 | A | 6/2000 | van Ketwich | |
| 6,075,316 | A | 6/2000 | Shi et al. | 313/504 |
| 6,082,887 | A | 7/2000 | Feuer et al. | |
| 6,099,408 | A | 8/2000 | Schneier et al. | |
| 6,115,601 | A | 9/2000 | Ferreira | |
| 6,135,884 | A | 10/2000 | Hendrick et al. | 463/20 |
| 6,155,925 | A | 12/2000 | Giobbi et al. | 463/20 |
| 6,203,427 | B1 | 3/2001 | Walker et al. | |
| 6,205,690 | B1 | 3/2001 | Heropoulos et al. | 40/442 |
| 6,210,279 | B1 | 4/2001 | Dickinson | |
| 6,225,985 | B1 | 5/2001 | Armstrong et al. | 345/177 |
| 6,227,970 | B1 | 5/2001 | Shimizu et al. | |
| 6,229,505 | B1 | 5/2001 | Fujii | 345/76 |
| 6,234,898 | B1 | 5/2001 | Belamant et al. | |
| 6,251,014 | B1 | 6/2001 | Stockdale et al. | |
| 6,254,481 | B1 | 7/2001 | Jaffe | 463/20 |
| 6,264,561 | B1 | 7/2001 | Saffari et al. | |
| 6,318,721 | B1 * | 11/2001 | Randall et al. | 273/148 R |
| 6,454,649 | B1 * | 9/2002 | Mattice et al. | 463/17 |
| 6,517,433 | B2 | 2/2003 | Loose et al. | |
| 6,554,704 | B2 * | 4/2003 | Nicastro et al. | 463/20 |
| 6,609,978 | B1 | 8/2003 | Paulsen | |
| 6,620,047 | B1 | 9/2003 | Alcorn et al. | |
| 6,632,122 | B2 | 10/2003 | Klitsner | |
| 6,636,203 | B1 | 10/2003 | Wong et al. | 345/173 |
| 6,638,165 | B2 | 10/2003 | Uchiyama et al. | |
| 6,646,864 | B2 | 11/2003 | Richardson | 361/681 |
| 6,667,738 | B2 | 12/2003 | Murphy | |
| 6,688,977 | B1 | 2/2004 | Baerlocher et al. | |
| 6,908,387 | B2 | 6/2005 | Hendrick et al. | |
| 6,988,247 | B2 | 1/2006 | Janevski | 715/835 |
| 6,996,426 | B2 | 2/2006 | Granberg | |
| 7,053,890 | B2 | 5/2006 | Inukai | 345/211 |
| 7,156,741 | B2 * | 1/2007 | Hornik et al. | 463/40 |
| 7,204,753 | B2 | 4/2007 | Ozaki et al. | 463/16 |
| 7,335,101 | B1 | 2/2008 | Luciano, Jr. | |
| 7,628,701 | B2 | 12/2009 | Wells | |
| 2001/0013681 | A1 * | 8/2001 | Bruzzese et al. | 273/143 A |
| 2001/0025881 | A1 | 10/2001 | Shepherd | |
| 2001/0040733 | A1 | 11/2001 | Toyoshima et al. | |
| 2002/0022509 | A1 * | 2/2002 | Nicastro et al. | 463/15 |
| 2002/0054030 | A1 | 5/2002 | Murphy | |
| 2002/0065132 | A1 | 5/2002 | Stephan | |
| 2002/0107075 | A1 | 8/2002 | Stephan | |
| 2002/0142825 | A1 | 10/2002 | Lark et al. | |
| 2002/0173354 | A1 | 11/2002 | Winans et al. | |
| 2003/0045343 | A1 | 3/2003 | Luccesi et al. | |
| 2003/0054868 | A1 | 3/2003 | Paulsen et al. | |
| 2003/0058233 | A1 | 3/2003 | Ahn et al. | 345/211 |
| 2003/0064784 | A1 * | 4/2003 | Wells et al. | 463/20 |
| 2003/0069057 | A1 * | 4/2003 | DeFrees-Parrott | 463/16 |
| 2003/0069070 | A1 | 4/2003 | Alcorn et al. | |
| 2003/0095374 | A1 | 5/2003 | Richardson | |
| 2003/0216167 | A1 * | 11/2003 | Gauselmann | 463/25 |
| 2003/0216173 | A1 * | 11/2003 | Gauselmann | 463/30 |
| 2003/0216174 | A1 * | 11/2003 | Gauselmann | 463/30 |
| 2004/0038721 | A1 | 2/2004 | Wells | |
| 2004/0152509 | A1 * | 8/2004 | Hornik et al. | 463/20 |
| 2004/0204204 | A1 | 10/2004 | Brilliant et al. | 455/575.1 |
| 2005/0054438 | A1 * | 3/2005 | Rothschild et al. | 463/29 |
| 2005/0059496 | A1 * | 3/2005 | Hanchar | 463/46 |
| 2005/0113163 | A1 | 5/2005 | Mattice et al. | |
| 2006/0062983 | A1 | 3/2006 | Irvin et al. | 428/220 |
| 2007/0093290 | A1 | 4/2007 | Winans et al. | |

FOREIGN PATENT DOCUMENTS

| | | | |
|---|---|---|---|
| AU | 2004200354 | | 8/2004 |
| DE | 44 36 171 | A1 | 4/1996 |
| EP | 0134979 | A2 | 3/1985 |
| EP | 0 769 769 | A | 4/1997 |
| EP | 0246021 | | 5/1997 |
| EP | 1082980 | | 9/2000 |
| EP | 1 063 622 | A2 | 12/2000 |
| EP | 1063622 | A2 * | 12/2000 |
| EP | 1074935 | A2 | 12/2000 |
| EP | 1 083 531 | A1 | 3/2001 |
| EP | 1081633 | A2 | 3/2001 |
| EP | 1550987 | A2 | 7/2005 |
| GB | 2 251 112 | A | 6/1992 |
| GB | 2 294 571 | A | 5/1996 |
| JP | 59-184925 | | 10/1984 |
| JP | 05-046308 | | 2/1993 |
| JP | 2000172444 | | 6/2000 |
| JP | 2001076886 | | 3/2001 |
| JP | 2002123363 | | 4/2002 |
| RU | 2060756 | | 5/1996 |
| RU | 2131141 | | 5/1999 |
| RU | 2161821 | | 1/2001 |
| RU | 2170947 | | 7/2001 |
| WO | WO 92/22864 | | 12/1992 |
| WO | WO 97/11448 | | 3/1997 |
| WO | WO 97/41677 | | 11/1997 |
| WO | WO 98/03962 | | 1/1998 |
| WO | WO 00/55716 | | 9/2000 |
| WO | WO 00/55879 | | 9/2000 |
| WO | WO 00/60669 | | 12/2000 |
| WO | WO 01/54384 | A1 | 7/2001 |
| WO | WO 01/57579 | | 8/2001 |
| WO | WO 01/74464 | | 10/2001 |
| WO | WO 02/091319 | | 11/2002 |
| WO | WO 03/088164 | | 10/2003 |
| WO | WO 2005/034056 | | 4/2005 |
| WO | WO 2006/039070 | | 4/2006 |

OTHER PUBLICATIONS

International Search Report dated Dec. 17, 2004 re PCT/US2004/028540.

Partial Search Report from related PCT/US2005/031689, 3 pages, dated Jan. 25, 2006.

Patent Abstracts of Japan: Publication No. 59202533, published Nov. 16, 1984.

Patent Abstracts of Japan: Publication No. 01032330, published Feb. 2, 1989.

International Search Report from related PCT/US2005/031689 dated Apr. 5, 2006.

Written Opinion from related PCT/US2005/031689 dated Apr. 5, 2006.

International Preliminary Examination Report from International App. No. PCT/US2004/028540 dated Mar. 23, 2006.

Office action from European Patent App. No. 04 782 934.6 dated Jul. 27, 2006.

USPTO Office Action mailed Oct. 5, 2005 in U.S. Appl. No. 10/139,801.

USPTO Final Office Action mailed Mar. 16, 2006 in U.S. Appl. No. 10/139,801.

USPTO Office Action mailed Jul. 15, 2006 in U.S. Appl. No. 10/139,801.

USPTO Final Office Action mailed Jan. 5, 2007 in U.S. Appl. No. 10/139,801.

USPTO Office Action mailed Dec. 4, 2007 in U.S. Appl. No. 10/139,801.

USPTO Final Office Action mailed Feb. 21, 2008 in U.S. Appl. No. 10/139,801.

USPTO Final Office Action mailed Jan. 5, 2007 in U.S. Appl. No. 10/139,801.

USPTO Office Action mailed Feb. 18, 2004 in U.S. Appl. No. 10/178,283.

USPTO Final Office Action mailed Aug. 26, 2004 in U.S. Appl. No. 10/178,283.

USPTO Office Action mailed May 9, 2006 in U.S. Appl. No. 10/178,283.

USPTO Final Office Action mailed Dec. 13, 2006 in U.S. Appl. No. 10/178,283.

USPTO Office Action mailed Jun. 19, 2007 in U.S. Appl. No. 10/178,283.

USPTO Final Office Action mailed Mar. 5, 2008 in U.S. Appl. No. 10/178,283.

USPTO Office Action mailed Jul. 30, 2008 in related U.S. Appl. No. 10/955,679.

WIPO International Search Report, dated Aug. 14, 2003, mailed in related International Patent Application No. PCT/US02/13863, 4 pages.

WIPO International Search Report mailed Oct. 1, 2003 in related International Patent Application No. PCT/US02/09293.

WIPO Written Opinion mailed Dec. 17, 2004 in International Patent Application No. PCT/US04/028540, 9 pages.

EPO Office Action dated Dec. 9, 2005, from European Application No. 02 725 894.6.

EPO European Examination Report, dated Dec. 12, 2007 from European Application No. 02 725 894.6.

EPO Office Action mailed Dec. 12, 2006 in European Patent Application No. 02 725 356.6, 6 pages.

EPO Extended European Search Report mailed Apr. 22,2008 in European Application No. 08100588.6.

EPO Office Action mailed Jun. 23, 2008 in related European Patent Application No. 04782934.6.

Examination Report mailed Feb. 28, 2006 in Australian Patent Application No. 2002255924.

Office Action mailed Nov. 8, 2006 in Australian Patent Application No. 2002255924, 2 pages.

Australian Examiner's Report, dated Feb. 16, 2007, from related International Application No. 2002256429.

Office Action mailed Sep. 15, 2005 in Russian Patent Application No. 2004131668.

Decision on Grant dated Mar. 14, 2006 in Russian Patent Application No. 2004131668.

Universal Display Corporation, "FOLED Flexible Organic Light Emitting Device", Apr. 25, 2002, <http://www.universaldisplay.com/foled.php>.

IBM, "Organic Light Emitting Diodes Project," Apr. 16, 2002, http://www.almaden.ibm.com/st/proiects/oleds/.

Kodak, "What It Is," Apr. 25, 2002, httr,://www.kodak.com/US/en/corp/display/overeview.jhtml.

Rolltronics, by Dr. James Sheats, "Introduction to Organic Light-Emitting Diodes (OLEDs)," Apr. 16, 2002, http://www.rolltronics.com/intro_oled.htp.

Sharp Data Sheet LD-12610B for LCD Display LQ10D421, dated Jun. 30, 2000.

USPTO Office Action mailed Aug. 20, 2008 in U.S. Appl. No. 10/139,801.

USPTO Office Action mailed Jan. 30, 2009 in U.S. Appl. No. 10/139,801.

USPTO Office Action mailed Oct. 31, 2008 in U.S. Appl. No. 11/546,659.

USPTO Office Action mailed Aug. 18, 2008 in U.S. Appl. No. 10/178,283.

USPTO Final Office Action mailed Jan. 26, 2009 in U.S. Appl. No. 10/178,283.

USPTO Final Office Action mailed Jan. 5, 2009 in U.S. Appl. No. 10/955,679.

WIPO International Preliminary Examination Report, dated Nov. 19, 2003, mailed in International Patent Application No. PCT/US02/13863, 2 pages.

EPO Office Action mailed Sep. 1, 2008 in European Application No. 08100588.6.

Australian Examiner's first Report, dated Jan. 23, 2008, in Australian Application No. 20044279019.

Examination Report mailed Jan. 15, 2009 in Australian Application No. 2007216701.

USPTO Notice of Allowance and Fee(s) due mailed Aug. 6, 2009 in U.S. Appl. No. 10/178,283.

USPTO Office Action mailed Jun. 9, 2009 in U.S. Appl. No. 10/955,679.

EPO European Examination Report, dated Jul. 20, 2009 from European Application No. 02 725 894.6.

EPO Summons to attend oral proceedings mailed May 15, 2009 in European Application No. 08100588.6.

Australian Examination Report mailed Feb. 10, 2009 in Application No. 2007234626.

USPTO Notice of Allowance mailed Sep. 14, 2009 in U.S. Appl. No. 10/139,801.

USPTO Notice of Allowance mailed Dec. 2, 2009 in U.S. Appl. No. 10/139,801.

USPTO Office Action mailed May 12, 2009 in U.S. Appl. No. 11/546,659.

USPTO Final Office Action mailed Nov. 20, 2009 in U.S. Appl. No. 10/955,679.

EPO European Exam Report mailed Jul. 20, 2009 in Application No. 02725894.6.

* cited by examiner

GAMING APPARATUS HAVING A CONFIGURABLE CONTROL PANEL

BACKGROUND

The present disclosure is generally related to gaming apparatus, and more particularly to a gaming apparatus having a configurable control panel.

Gaming units, like many controllable devices, often need to provide the capability for receiving different types of user input such as selecting among different choices at a given stage of a game and/or presenting various different sets of choices, for user selection, depending on which of multiple stages of a game have been reached. For example, many gaming units are configured to provide a main game component and a "bonus" game component in which the bonus component is not necessarily played as a part of each "round" of the main gaming component, e.g., in which the bonus game is only played in response to one or more predetermined outcomes of the main game component. In many situations, the bonus game involves user activation of user input or controls for functions which are different from functions which appear in the main game component.

Some previous approaches to design of gaming units involved including a plurality of different mechanical switches which may be activatable or usable at different times during the stage of a game. A "mechanical" switch may be a switch which is activated by touching or pressing a switch activation surface, which may cause the switch activation surface to move. As used herein, a mechanical switch, however, does not include a touch screen device in which touches of a region of, for example, a display device are detected. The variety of different types of user inputs which are typically provided in games designed to maintain user interest and entertainment has meant that a relatively large number of such mechanical switches have been provided in previous designs. In some devices, a single mechanical switch is used for two or more functions with each of the two or more functions being displayed on the button activation surface.

SUMMARY OF THE INVENTION

In one aspect, the invention is directed to a gaming method for facilitating game play via a gaming apparatus. The gaming apparatus may include a value input device, a first display unit, and a configurable control panel unit. The configurable control panel unit may include a second display unit and a touch screen unit associated with the second display unit. The gaming method may comprise receiving a value input from a player via the value input device, and causing the first display unit to display a first game display relating to one of the following games: poker, blackjack, slots, keno or bingo. The method may also comprise selecting one of a plurality of player input displays, and causing the second display unit to display the selected one of the plurality of player input displays. The method additionally may comprise receiving player input data associated with the selected one of the plurality of player input displays via the touch screen unit, and determining a value payout associated with an outcome of the game.

In another aspect, the invention is directed to a gaming apparatus. The gaming apparatus may comprise a first display unit, and a value input device. The gaming apparatus also may comprise a configurable control panel unit, the configurable control panel unit comprising a second display unit, and a touch screen unit, the touch screen unit including a touch screen device associated with the second display unit. The gaming apparatus additionally may comprise a controller operatively coupled to the first display unit, the value input device, the second display unit, and the touch screen unit, the controller comprising a processor and a memory operatively coupled to the processor. The controller may be programmed to receive value input data via the value input device, and to cause the first display unit to generate a first game display relating to one of the following games: poker, blackjack, slots, keno or bingo. The controller also may be programmed to select one of a plurality of player input displays, and to cause the second display unit to generate the selected one of the plurality of player input displays. The controller additionally may be programmed to receive player input data associated with the selected one of the plurality of player input displays via the touch screen unit, and to determine a value payout associated with an outcome of the game.

In yet another aspect, the invention is directed to a gaming method for facilitating game play via a gaming apparatus. The gaming apparatus may include a value input device, a first display unit, and a configurable control panel unit. The configurable control panel unit may include a second display unit and a touch screen unit associated with the second display unit. The method may comprise receiving a value input from a player via the value input device, and causing the first display unit to display a first game display relating to one of the following games: poker, blackjack, slots, keno or bingo. The method additionally may comprise causing the second display unit to display a first player input display, the first player input display comprising a first plurality of buttons, and receiving player input data associated with the first plurality of buttons via the touch screen unit. The method may further comprise determining a value payout associated with an outcome of the game.

In still another aspect, the invention is directed to a gaming apparatus. The gaming apparatus may comprise a first display unit, and a value input device. The gaming apparatus also may comprise a configurable control panel unit, the configurable control panel unit comprising a second display unit, and a touch screen unit, the touch screen unit including a touch screen device associated with the second display unit. The gaming apparatus additionally may comprise a controller operatively coupled to the first display unit, the value input device, the second display unit, and the touch screen unit, the controller comprising a processor and a memory operatively coupled to the processor. The controller may be programmed to receive value input data via the value input device, and to cause the first display unit to generate a first game display relating to one of the following games: poker, blackjack, slots, keno or bingo. The controller additionally may be programmed to cause the second display unit to generate a first player input display, the first player input display comprising a first plurality of buttons, and to receive player input data associated with the first plurality of buttons via the touch screen unit. The controller also may be programmed to determine a value payout associated with an outcome of the game.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
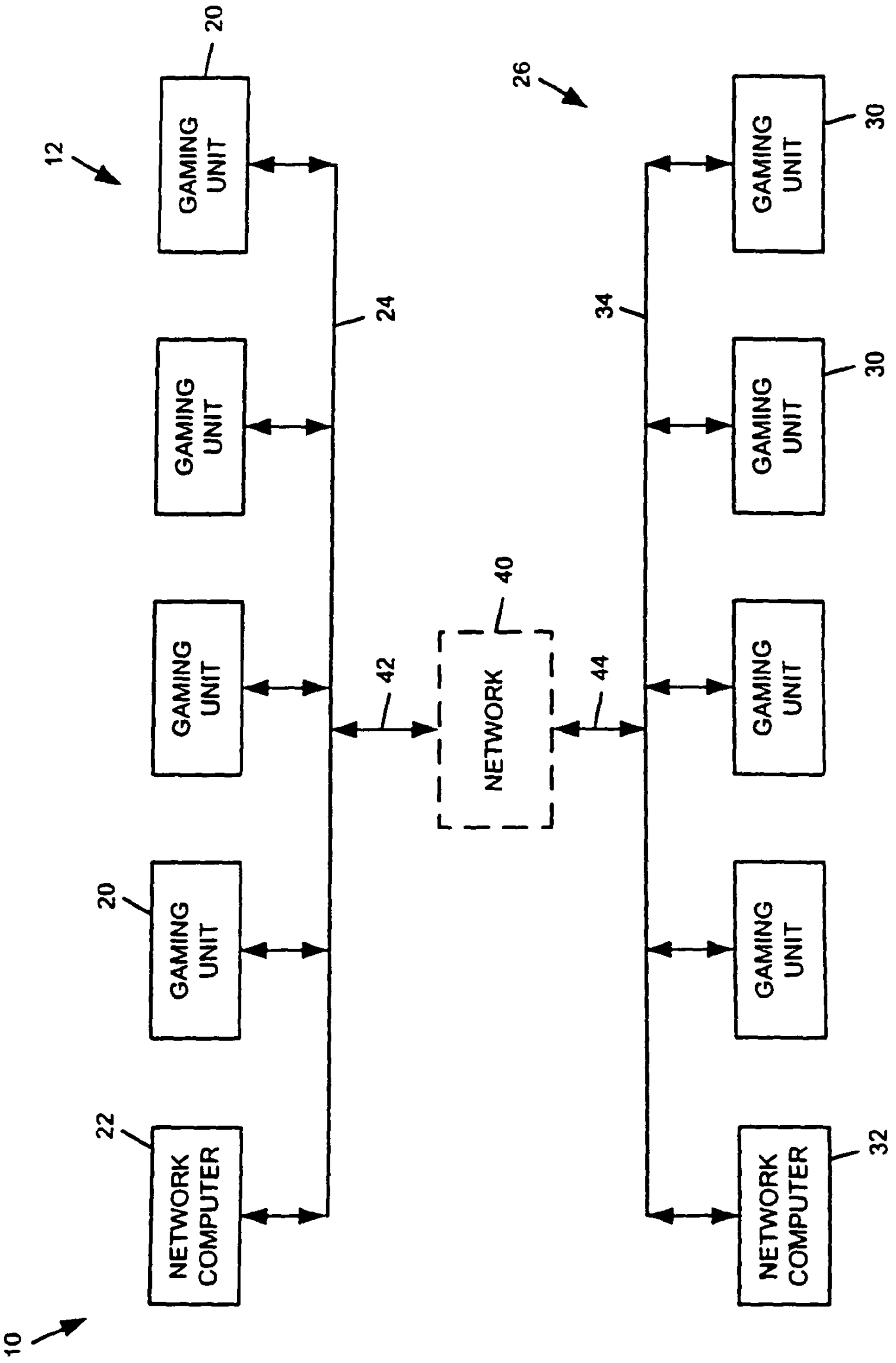
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
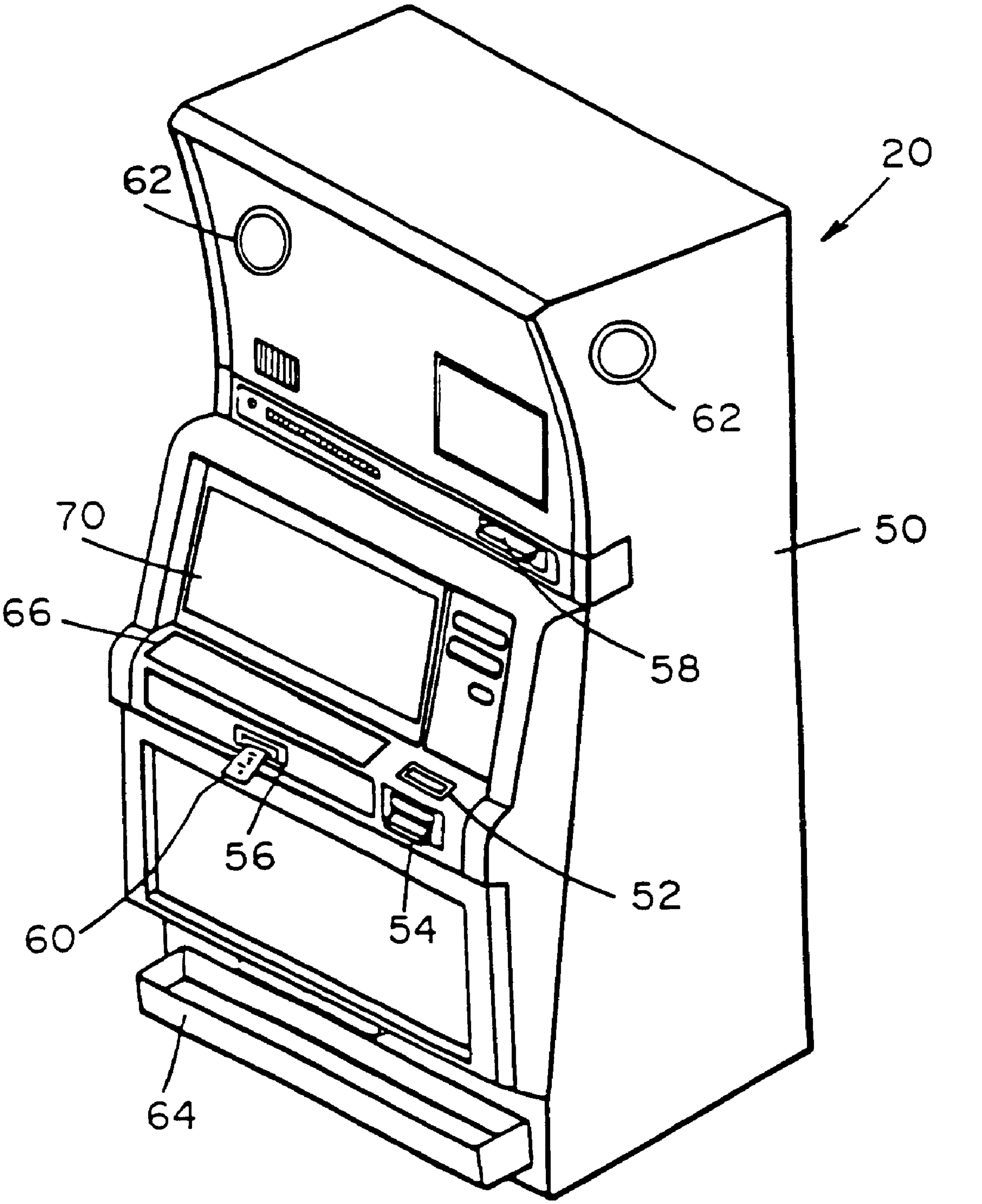
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
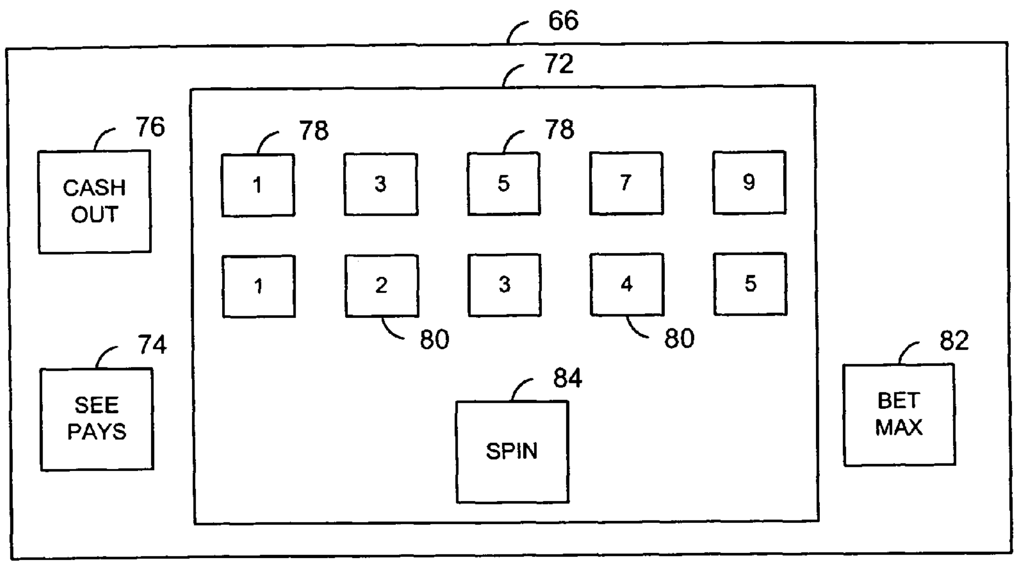
FIG. 2A illustrates an embodiment of a configurable control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a display area 72 in which text, images, video, etc., can be displayed via a display unit separate from the display unit 70 (FIG. 2). For example, one or more "buttons," such as buttons 78, 80, and 84, may be displayed in the display area 72. A button displayed in the display area 72 may be an area differentiated by a line or lines and/or a different color than other areas in the display area 72. The control panel 66 may also include some type of mechanism to determine if a player touched a particular portion of the display area 72 (e.g., a displayed button). For example, a touch screen device could overlap the display area 72. The display area 72 to may be used to display different buttons, images, video, etc., for different games, for different stages of a game, to attract players, etc.

The control panel 66 may include one or more (or none) buttons, lights, etc., outside of the display area 72. For example, the control panel 66 may include buttons such as buttons 74, 76, and 82. Buttons outside of the display area 72 may include any device that allows a player to make an input, such as an input device that must be depressed to make an input selection (e.g., a mechanical button), or an area of the control panel 66 that a player may simply touch (e.g., the same touch screen device associated with the display area 72 or a touch screen device separate from the touch screen device associated with the display area 72).

The control panel 66 of FIG. 2A may be used where the gaming unit 20 is a slot machine having a plurality of mechanical or "virtual" reels. The control panel 66 may include a "See Pays" button 74 that, when activated, causes the display unit 70 to generate one or more display screens showing the odds or payout information for the game or games provided by the gaming unit 20. The control panel 66 may include a "Cash Out" button 76 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the display area 72 may include a plurality of selection buttons 78, each of which allows the player to select a different number of paylines prior to spinning the reels. For example, five buttons 78 may be displayed, each of which may allow a player to select one, three, five, seven or nine paylines.

If the gaming unit 20 provides a slots game having a plurality of reels, the display area 72 may include a plurality of selection buttons 80 each of which allows a player to specify a wager amount for each payline selected. For example, if the smallest wager accepted by the gaming unit 20 is a quarter ($0.25), the display area 72 may display five selection buttons 80, each of which may allow a player to select one, two, three, four or five quarters to wager for each payline selected. In that case, if a player were to activate the "5" button 80 (meaning that five paylines were to be played on the next spin of the reels) and then activate the "3" button 80 (meaning that three coins per payline were to be wagered), the total wager would be $3.75 (assuming the minimum bet was $0.25).

The control panel 66 may include a "Max Bet" button 82 to allow a player to make the maximum wager allowable for a game. In the above example, where up to nine paylines were provided and up to five quarters could be wagered for each payline selected, the maximum wager would be 45 quarters, or $11.25. A spin button 82 may be displayed in display area 72 to allow the player to initiate spinning of the reels of a slots game after a wager has been made.

Although one possible control panel 66 is described above, it should be understood that different buttons could be utilized in the control panel 66, and that the particular buttons used may depend on the game or games that could be played on the gaming unit 20. Additionally, some or all of the buttons 74, 76, and 82 could be displayed in the display area 72, and some or all of the buttons 78, 80, or 84 could be outside of the display area 72.

Gaming Unit Electronics

Figure 3:
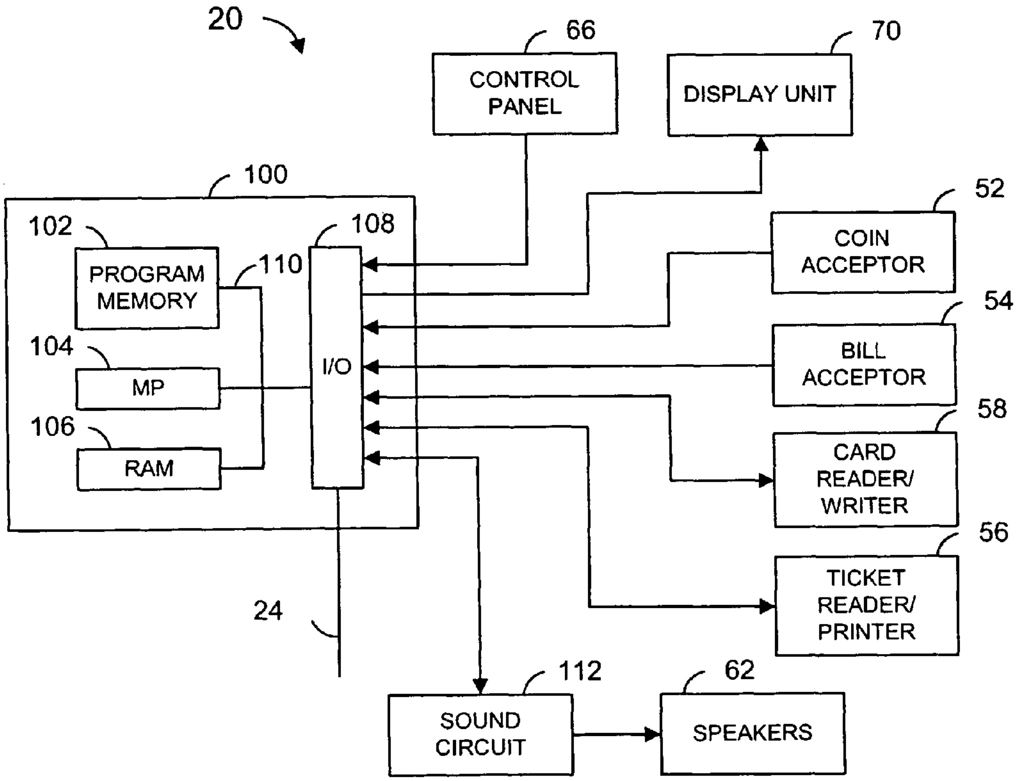
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct lineaor conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
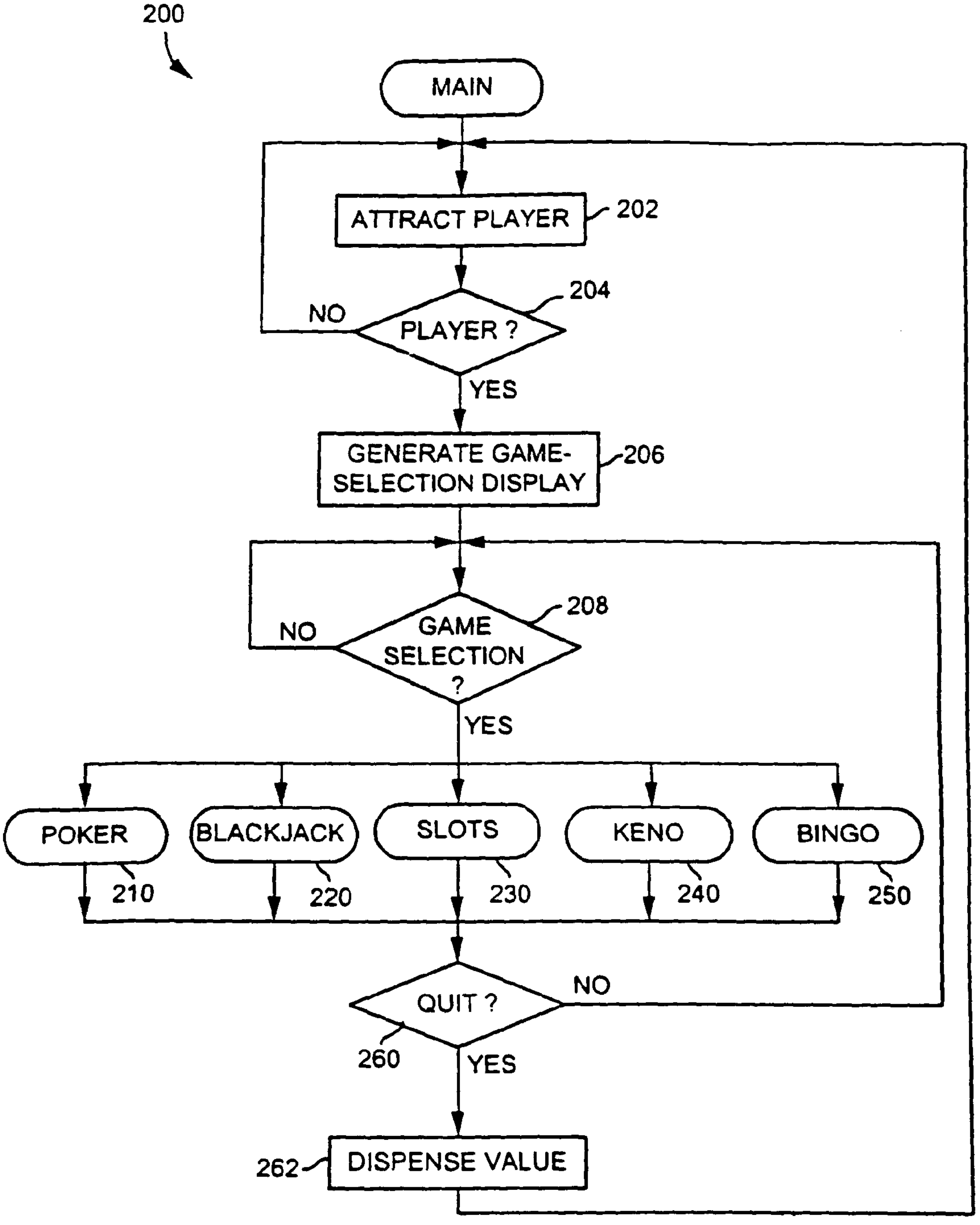
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or the display area 72 of the control panel 66, and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit), and/or the display area 72 of the control panel 66, at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into 20 the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
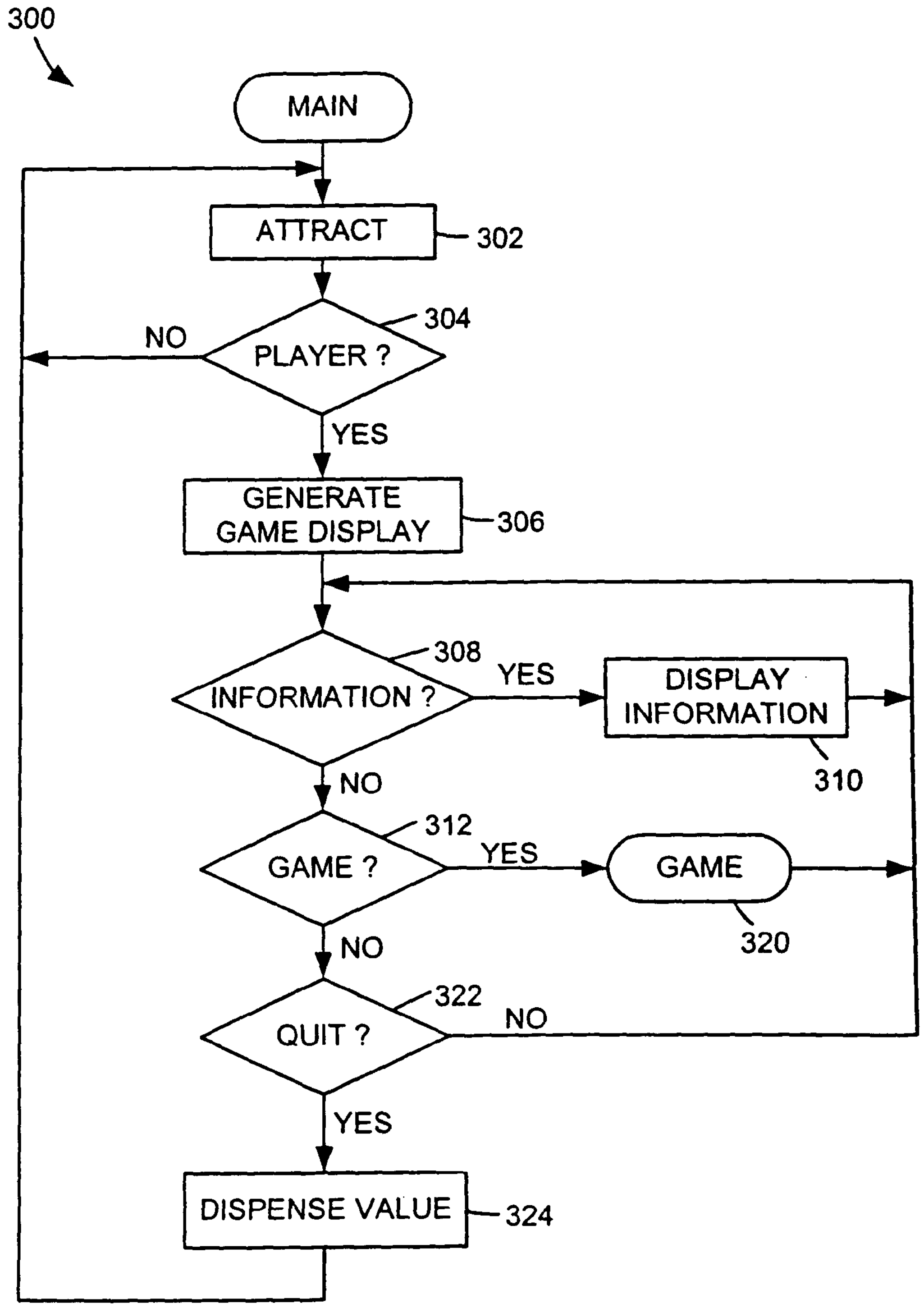
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit), and/or the display area 72 of the control panel 66, and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. Also, an input display may be generated on the display area 72 of the control panel 66. The input display may include, for example, images of buttons for making selections. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Figure 6A:
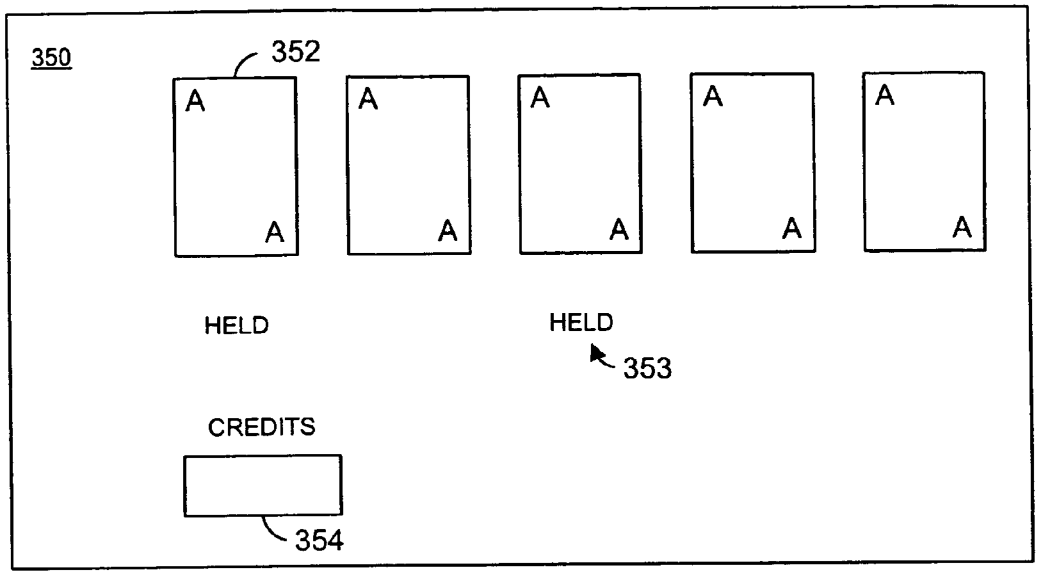
FIG. 6A is an illustration of an embodiment of a visual display that may be displayed during performance of the video poker routine of FIG. 8.

Video Poker

Where the gaming unit 20 is designed to facilitate play of a video poker game, the display unit 70 may comprise a video display unit. FIG. 6A is an example display 350 that may be shown on the display unit 70 during performance of the video poker routine 210 shown schematically in FIG. 4. Referring to FIG. 6A, the display 350 may include video images 352 of a plurality of playing cards representing the player's hand, such as five cards. Also, the display 350 may include one or more indicators 353 proximate to each card that the player has chosen to "hold." For example, the indicator 353 may include the word "HELD." The display 350 may also include an area 354 in which the number of remaining credits or value is displayed.

Figure 6B:
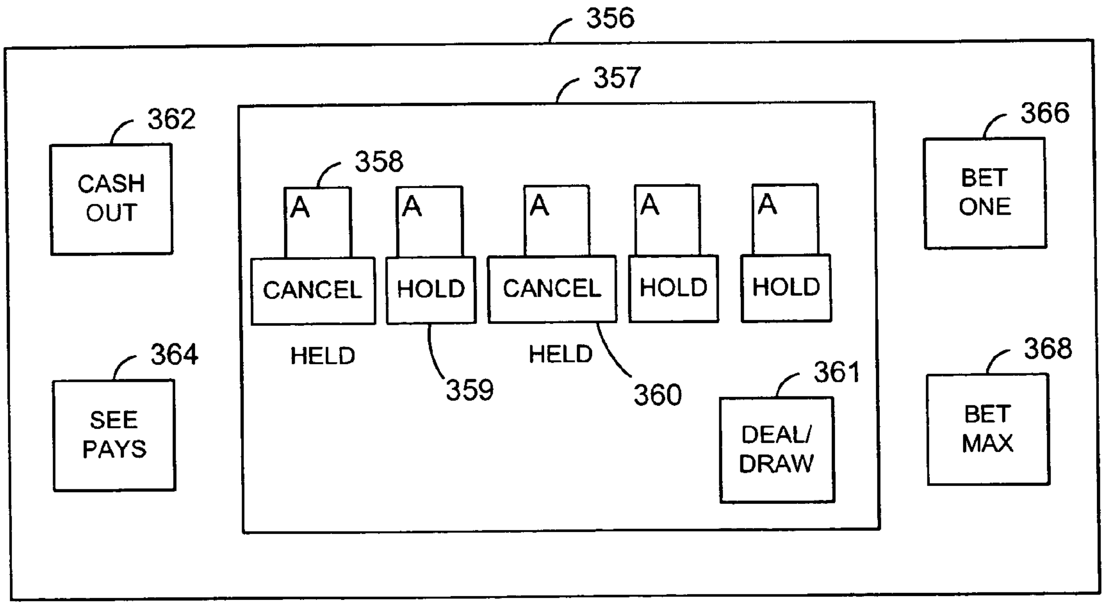
FIG. 6B is an illustration of an embodiment of a configurable control panel during performance of the video poker routine of FIG. 8.

FIG. 6B is an example control panel 356 that may be used to facilitate play of a video poker game. The control panel 356 is similar to the control panel 66 described with reference to FIG. 2A. In particular, the control panel 356 may include a display area 357 having an associated mechanism to determine if a player touched a particular portion of the display area 357. FIG. 6B illustrates an example player input display that may be displayed in the display area 357 during performance of the video poker routine 210 shown schematically in FIG. 4.

To allow the player to control the play of the video poker game, a plurality of player-selectable buttons may be provided and/or displayed on the control panel 356. Images 358 of playing cards representing the player's hand, and corresponding with the images 352 shown on the display 350 of FIG. 6A, may be displayed in the display area 357. Additionally, a plurality of "Hold" buttons 359 may be displayed on, proximate to, etc., the images 358. A player may use a "Hold" button 359 to choose to "Hold" a corresponding card. Once held, a "Cancel" button 360 may be displayed on, proximate to, etc., the held card to allow the player to cancel the "Hold" request. In one embodiment, the playing card image 358 may be the "Hold" button 359 and the "Cancel" button 360. For example, the word "Hold" or the word "Cancel" could be displayed in the image 358. Then, the player could select the card image 158 to "Hold" or cancel the "Hold."

A "Deal/Draw" button 361 may be displayed in the display area 357. In one embodiment, the "Deal/Draw" button 361 may either include the word "Deal" or "Draw" depending on the point in the game. Other buttons may include a "Cash Out" button 362, a "See Pays" button 364, a "Bet One Credit" button 366, and a "Bet Max Credits" button 368.

Figure 8:
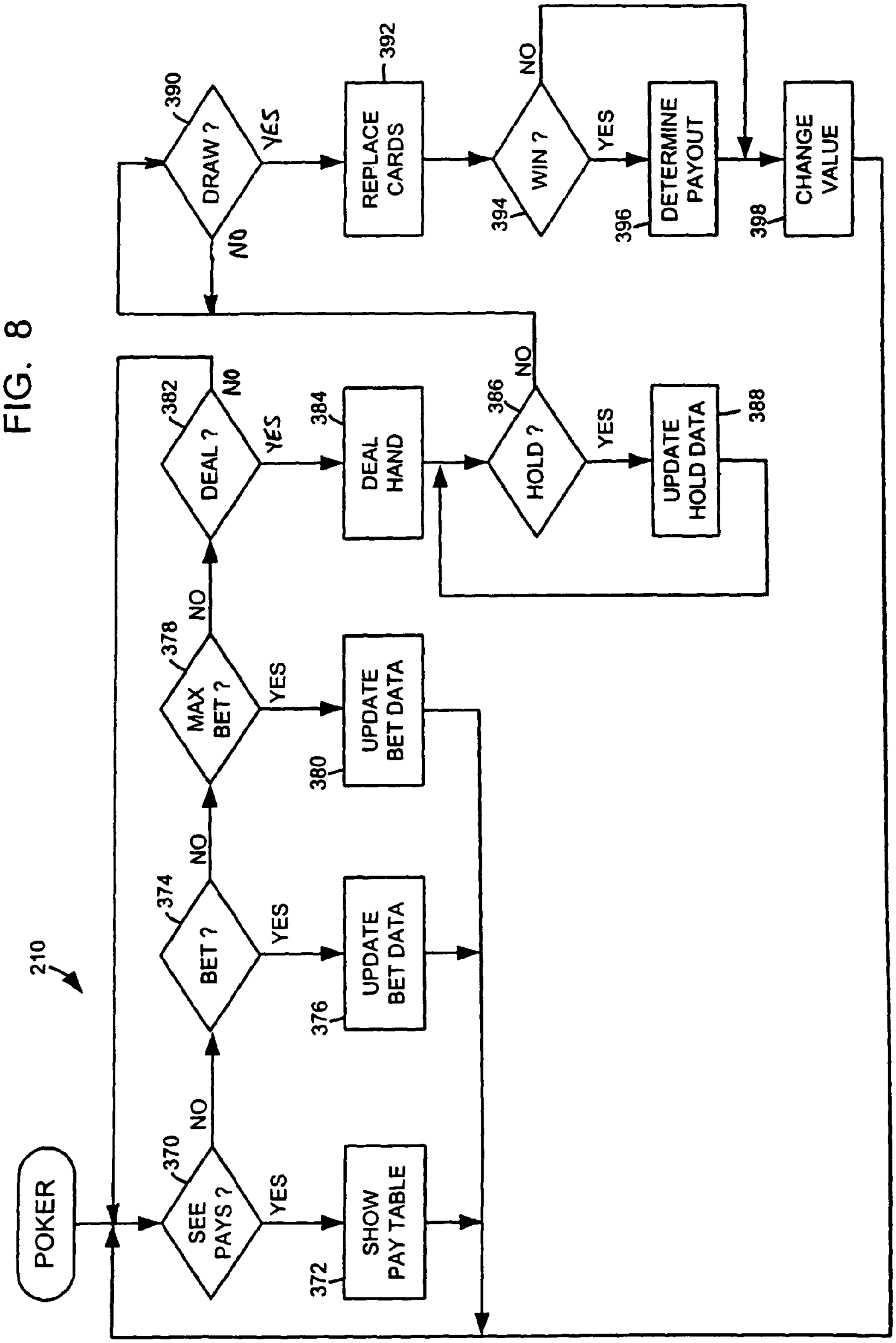
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 364, in which case at block 372 the routine may cause one or more pay tables to be displayed on the display unit 70. At block 374, the routine may determine whether the player has made a bet, such as by pressing the "Bet One Credit" button 366, in which case at block 376 bet data corresponding to the bet made by the player may be stored in the memory of the controller 100. At block 378, the routine may determine whether the player has pressed the "Bet Max Credits" button 368, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 361 was activated after a wager was made. In that case, at block 384 a video poker hand may be "dealt" by causing the display unit 70 to generate the playing card images 352. After the hand is dealt, at block 386 the routine may determine if any of the "Hold" buttons 359 have been activated by the player, in which case data regarding which of the playing card images 352 are to be "held" may be stored in the controller 100 at block 388. If the "Deal/Draw" button 361 is activated again as determined at block 390, each of the playing card images 352 that was not "held" may be caused to disappear from the video display 350 and the display area 357, and to be replaced by a new, randomly selected, playing card image 352, 358 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7A:
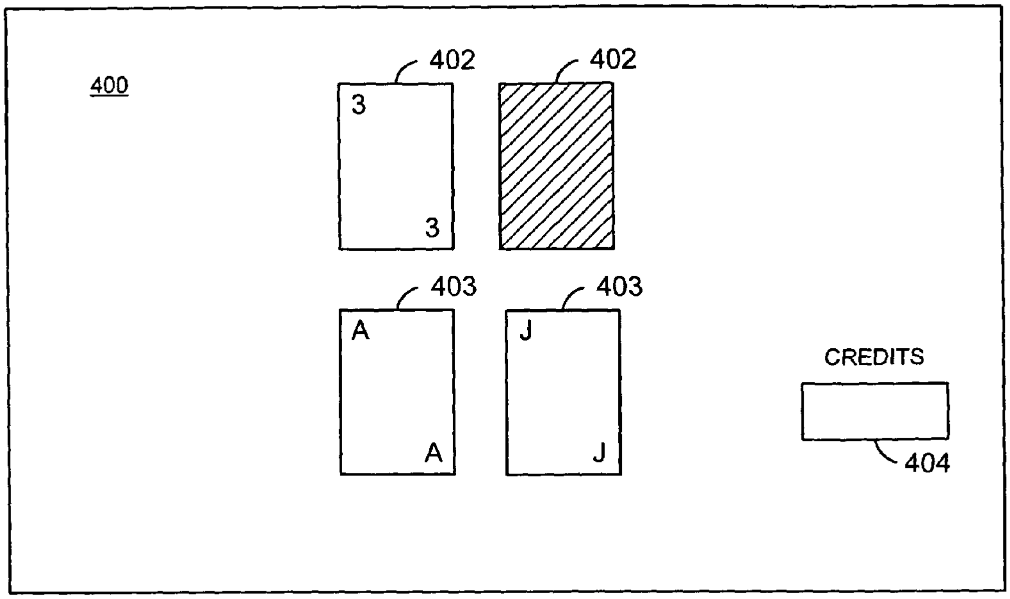
FIG. 7A is an illustration of an embodiment of a visual display that may be displayed during performance of the video blackjack routine of FIG. 9.

Video Blackjack

Where the gaming unit 20 is designed to facilitate play of a video blackjack game, the display unit 70 may comprise a video display unit. FIG. 7A is an exemplary display 400 that may be shown on the display unit 70 during performance of the video blackjack routine 220 shown schematically in FIG. 4. Referring to FIG. 7A, the display 400 may include video images 402 of a pair of playing cards representing a dealer's hand, with one of the cards shown face up and the other card being shown face down, and video images 403 of a pair of playing cards representing a player's hand, with both the cards shown face up. The "dealer" may be the gaming unit 20. The display 400 may also include an area 404 in which the number of remaining credits or value is displayed.

Figure 7B:
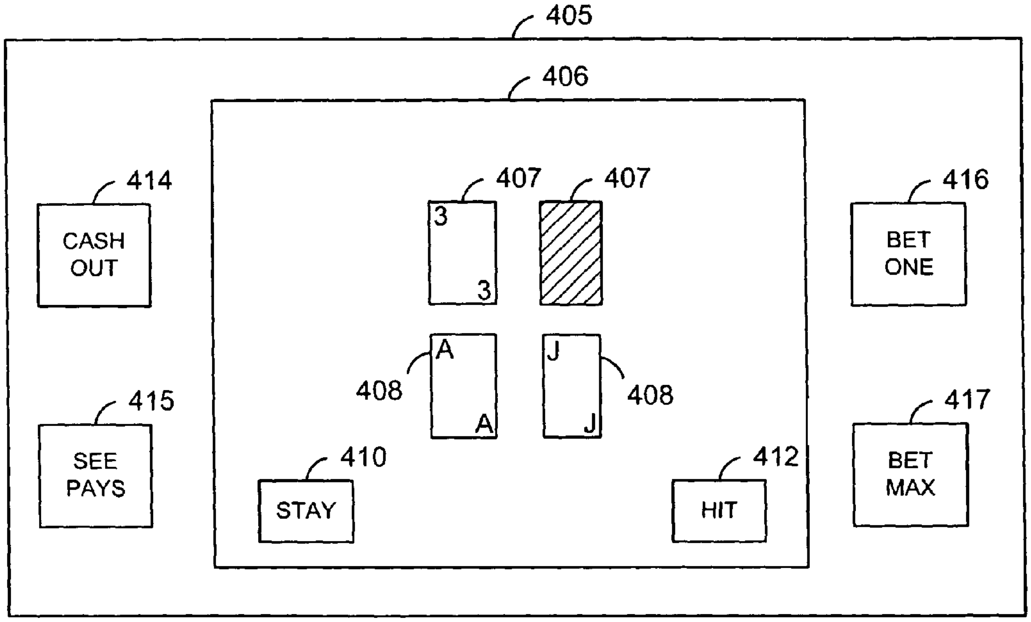
FIG. 7B is an illustration of an embodiment of a configurable control panel during performance of the video blackjack routine of FIG. 9.

FIG. 7B is an example control panel 405 that may be used to facilitate play of a video blackjack game. The control panel 405 is similar to the control panel 66 described with reference to FIG. 2A. In particular, the control panel 405 may include a display area 406 having an associated mechanism to determine if a player touched a particular portion of the display area 406. FIG. 7B illustrates an example player input display that may be displayed in the display area 406 during performance of the video blackjack routine 220 shown schematically in FIG. 4.

To allow the player to control the play of the video blackjack game, a plurality of player-selectable buttons may be provided and/or displayed on the control panel 405. Images 407 and 408 of playing cards representing the dealer's hand and the player's hand, respectively, and corresponding with the images 402, 403 shown on the display 400 of FIG. 7A, may be displayed in the display area 406. Additionally, a "Stay" button 410 and a "Hit" button 412 may be displayed in the display area 406. Other buttons may include a "Cash Out" button 414, a "See Pays" button 415, a "Bet One Credit" button 416, and a "Bet Max Credits" button 417.

Figure 9:
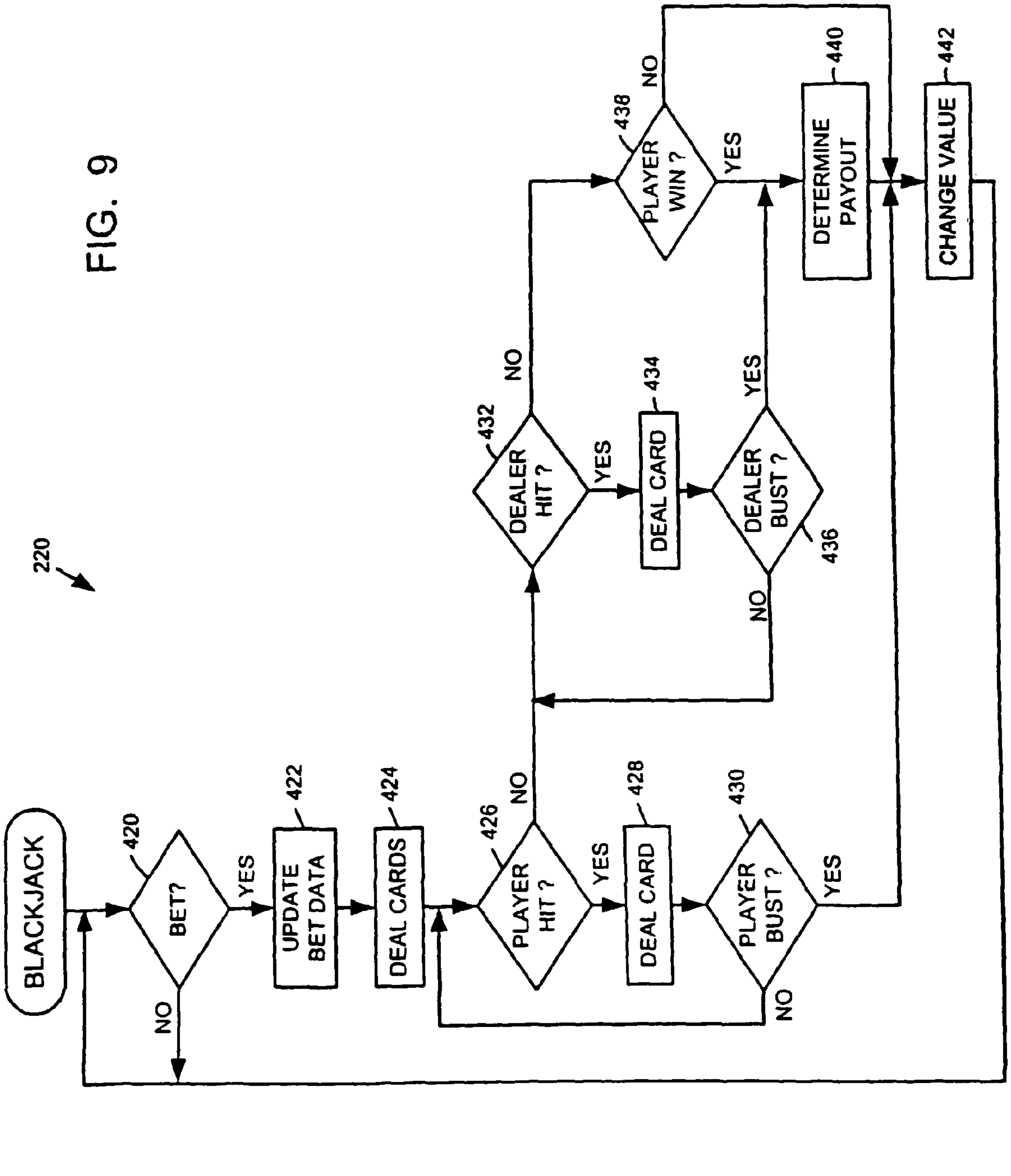
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 416 or the "Bet Max Credits" button 417. At block 422, bet data corresponding to the bet made at block 420 may be stored in the memory of the controller 100. At block 424, a dealer's hand and a player's hand may be "dealt" by making the playing card images 402, 403 appear on the display unit 70, and the playing card images 407, 408 appear in the display area 406 of the control panel 405.

At block 426, the player may be allowed to be "hit," in which case at block 428 another card will be dealt to the player's hand by making another playing card image 403 appear in the display 400, and another playing card image 408 appear in the display area 406 of the control panel 405. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400, and another card image 407 appear in the display are 406 of the control panel 405. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 404 (FIG. 7A).

Figure 10:
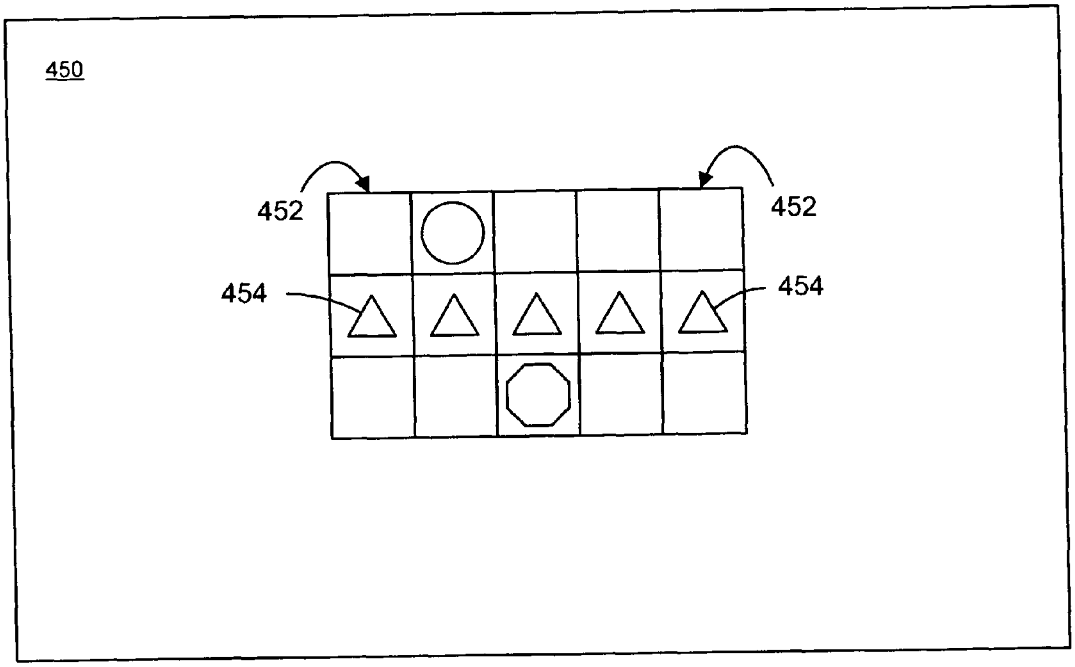
FIG. 10 is an illustration of an embodiment of a visual display that may be displayed during performance of the slots routine of FIG. 12.

Slots

Where the gaming unit 20 is designed to facilitate play of a video slots game, the display unit 70 may comprise a video display unit. FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

FIG. 2A is an example control panel 66 that may be used to facilitate play of a video poker game. As previously described, the control panel 66 may include the display area 72 having an associated mechanism to determine if a player touched a particular portion of the display area 72. FIG. 2A illustrates an example player input display that may be displayed in the display area 72 during performance of the slots routine 230 shown schematically in FIG. 4.

To allow the player to control the play of the slots game, a plurality of player-selectable buttons may be provided or displayed on the control panel 66. The buttons may include a "Cash Out" button 76, a "See Pays" button 74, a plurality of payline-selection buttons 78 each of which allows the player to select a different number of paylines prior to "spinning" the reels, a plurality of bet-selection buttons 80 each of which allows a player to specify a wager amount for each payline selected, a "Spin" button 84, and a "Max Bet" button 82 to allow a player to make the maximum wager allowable.

Figure 12:
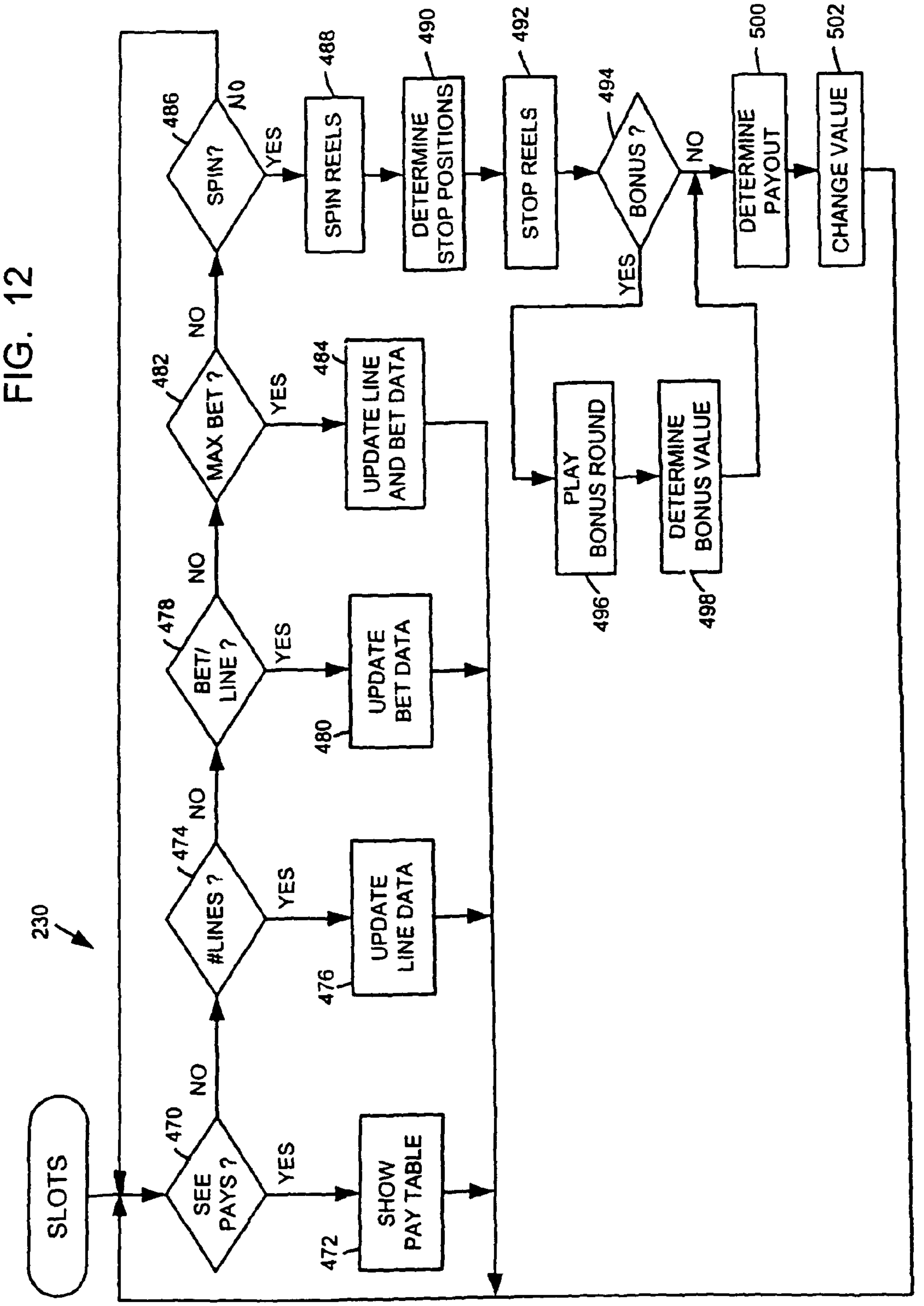
FIG. 12 is a flowchart of an embodiment of a slots routine that may be performed by one or more of the gaming units.

FIG. 12 is a flowchart of the slots routine 230 shown schematically in FIG. 4. Referring to FIG. 12, at block 470, the routine may determine whether the player has requested payout information, such as by activating the "See Pays" button 74, in which case at block 472 the routine may cause one or more pay tables to be displayed on the display unit 70 and/or in the display area 72 of the control panel 66. At block 474, the routine may determine whether the player has pressed one of the payline-selection buttons 78, in which case at block 476 data corresponding to the number of paylines selected by the player may be stored in the memory of the controller 100. At block 478, the routine may determine whether the player has pressed one of the bet-selection buttons 80, in which case at block 480 data corresponding to the amount bet per payline may be stored in the memory of the controller 100. At block 482, the routine may determine whether the player has pressed the "Max Bet" button 82, in which case at block 484 bet data (which may include both payline data and bet-per-payline data) corresponding to the maximum allowable bet may be stored in the memory of the controller 100.

If the "Spin" button 8 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 11A:
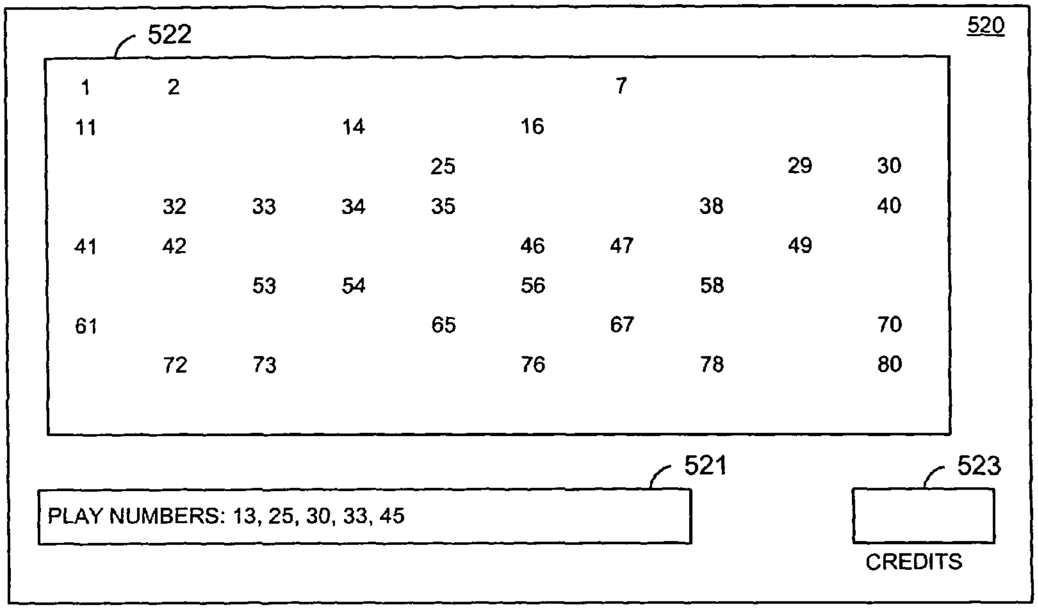
FIG. 11A is an illustration of an embodiment of a visual display that may be displayed during performance of the video keno routine of FIG. 13.

Video Keno

Where the gaming unit 20 is designed to facilitate play of a video keno game, the display unit 70 may comprise a video display unit. FIG. 11A is an exemplary display 520 that may be shown on the display unit 70 during performance of the video keno routine 240 shown schematically in FIG. 4. Referring to FIG. 11A, the display 520 may include a video image 521 of a plurality of numbers that were selected by the player prior to the start of a keno game and a video image 522 of a plurality of numbers randomly selected during the keno game. The randomly selected numbers may be displayed in a grid pattern. The display 520 may also include an area 523 in which the number of remaining credits or value is displayed.

Figure 11B:
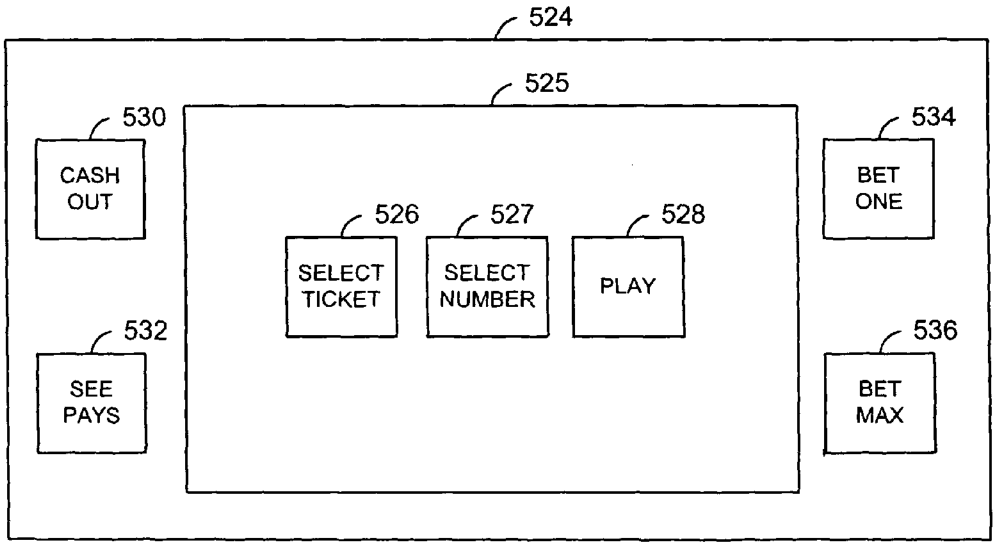
FIG. 11B is an illustration of an embodiment of a configurable control panel during performance of the video keno routine of FIG. 13.

FIG. 11B is an example control panel 524 that may be used to facilitate play of a keno game. The control panel 524 is similar to the control panel 66 described with reference to FIG. 2A. In particular, the control panel 524 may include a display area 525 having an associated mechanism to determine if a player touched a particular portion of the display area 525. FIG. 11B illustrates an example player input display that may be displayed in the display area 406 during performance of the keno routine 240 shown schematically in FIG. 4.

To allow the player to control the play of the keno game, a plurality of player-selectable buttons may be provided and/or displayed on the control panel 524. A "Select Ticket" button 526, a "Select Number" button 527, and a "Play" button 528 may be provided in the display area 525. Other buttons may include a "Cash Out" button 530, a "See Pays" button 532, a "Bet One Credit" button 534, and a "Bet Max Credits" button 536.

Figure 13:
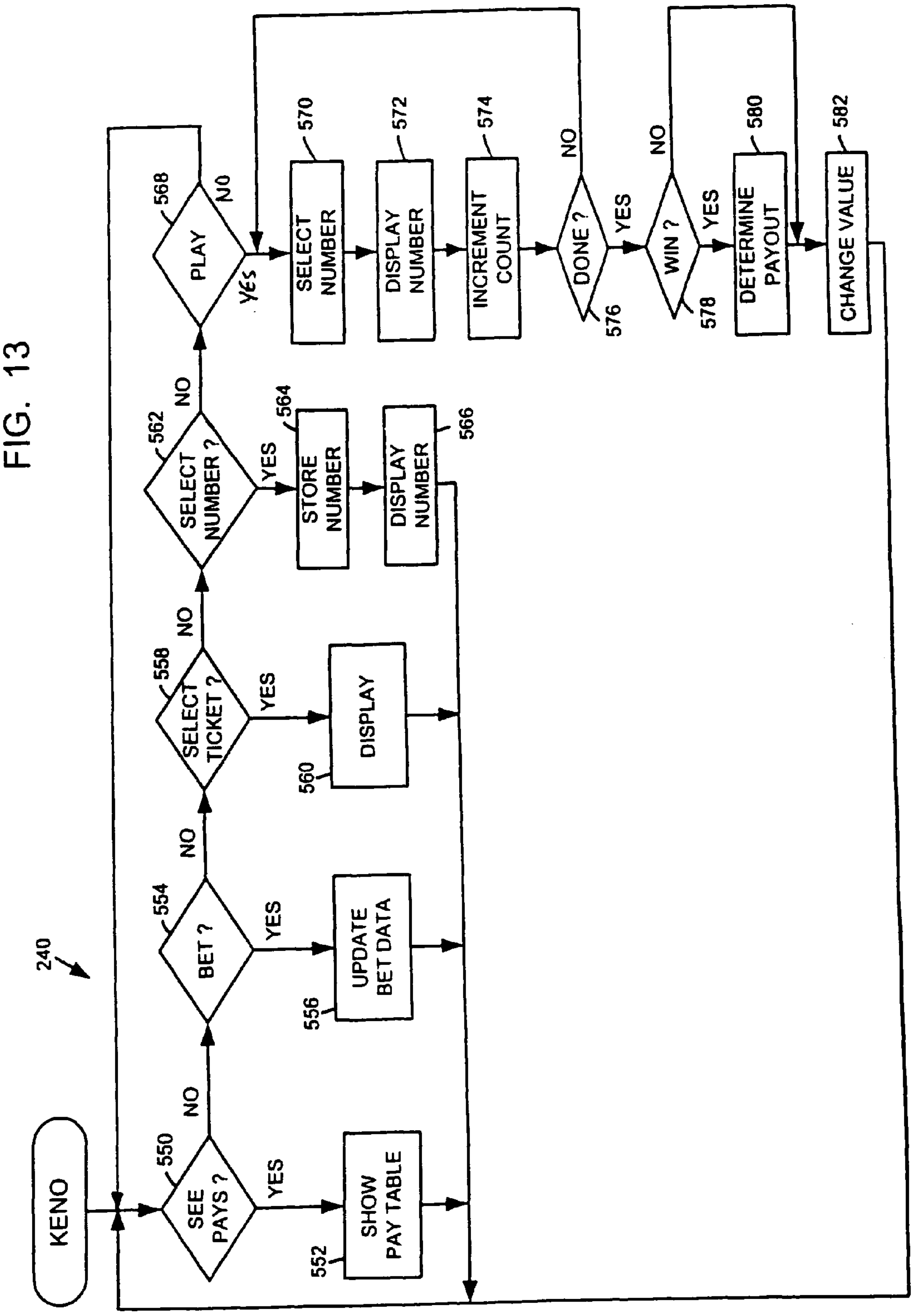
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 532, in which case at block 552 the routine may cause one or more pay tables to be displayed on the display unit 70 and/or in the display area 525. At block 554, the routine may determine whether the player has made a bet, such as by having pressed the "Bet One Credit" button 534 or the "Bet Max Credits" button 536, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 523 (FIG. 11A).

Figure 14A:
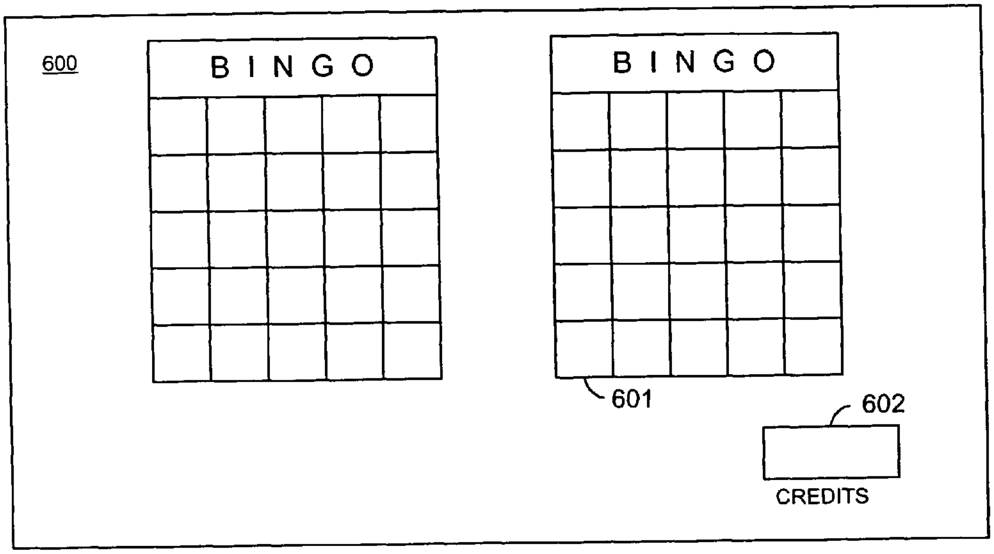
FIG. 14A is an illustration of an embodiment of a visual display that may be displayed during performance of the video bingo routine of FIG. 15.

Video Bingo

Where the gaming unit 20 is designed to facilitate play of a video bingo game, the display unit 70 may comprise a video display unit. FIG. 14A is an exemplary display 600 that may be shown on the display unit 70 during performance of the video bingo routine 250 shown schematically in FIG. 4. Referring to FIG. 14A, the display 600 may include one or more video images 602 of a bingo card and images of the bingo numbers selected during the game. The bingo card images 602 may have a grid pattern. The display 600 may also include an area 602 in which the number of remaining credits or value is displayed.

Figure 14B:
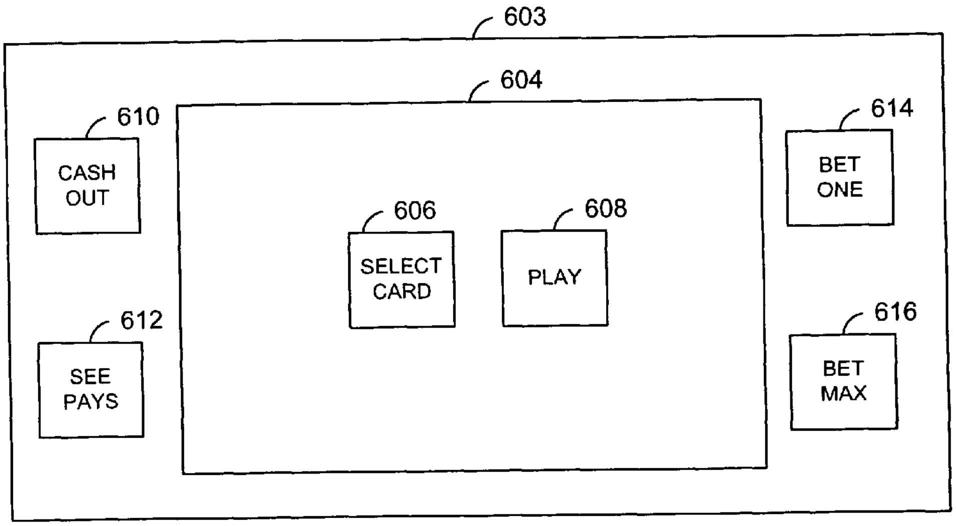
FIG. 14B is an illustration of an embodiment of a configurable control panel during performance of the video bingo routine of FIG. 15.

FIG. 14B is an example control panel 603 that may be used to facilitate play of a bingo game. The control panel 603 is similar to the control panel 66 described with reference to FIG. 2A. In particular, the control panel 603 may include a display area 604 having an associated mechanism to determine if a player touched a particular portion of the display area 604. FIG. 11B illustrates an example player input display that may be displayed in the display area 604 during performance of the bingo routine 250 shown schematically in FIG. 4.

To allow the player to control the play of the bingo game, a plurality of player-selectable buttons may be provided and/or displayed on the control panel 603. A "Select Card" button 606 and a "Play" button 608 may be provided in the display area 604. Other buttons may include a "Cash Out" button 610, a "See Pays" button 612, a "Bet One Credit" button 614, and a "Bet Max Credits" button 616.

Figure 15:
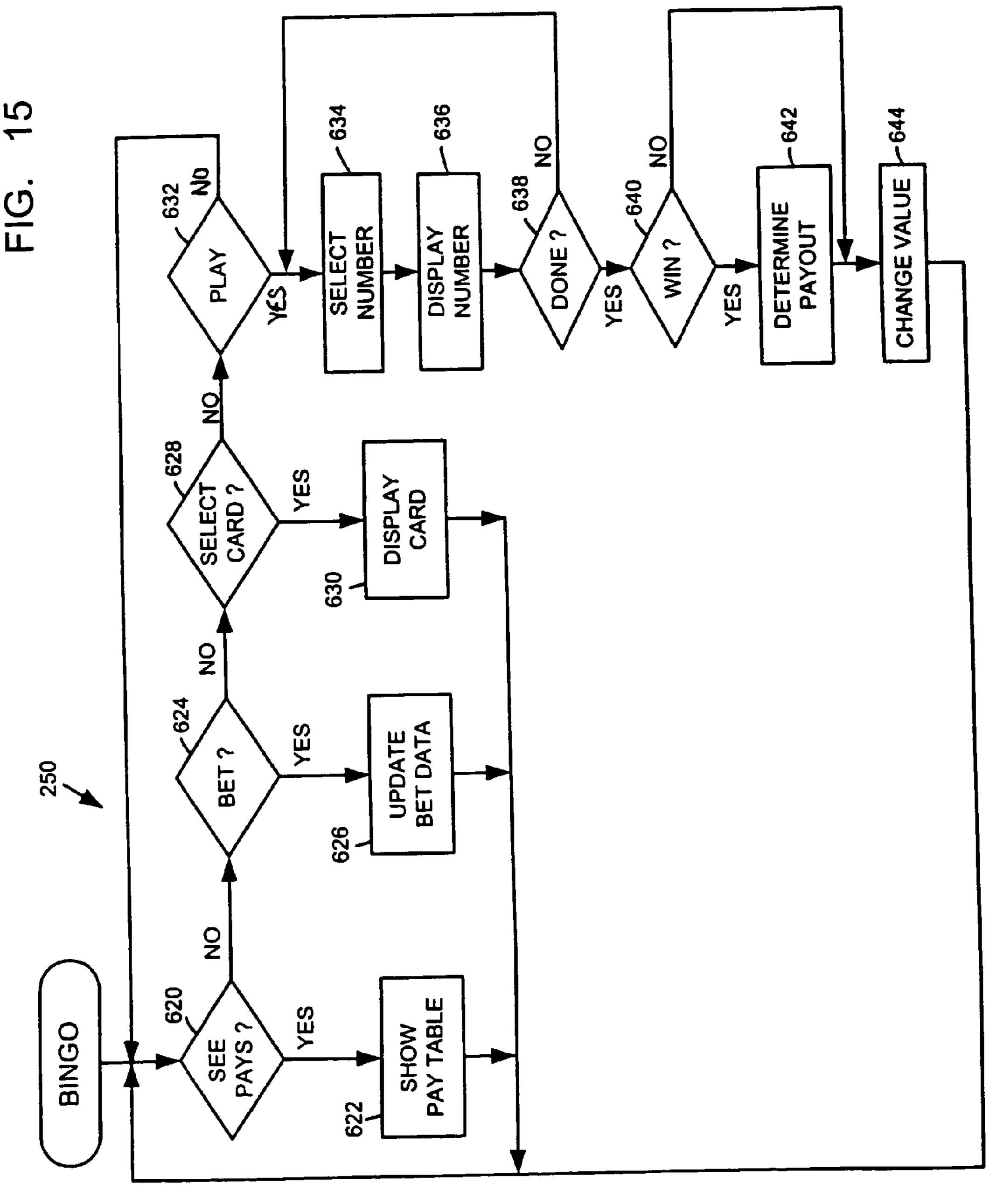
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 612, in which case at block 622 the routine may cause one or more pay tables to be displayed on the display unit 70. At block 624, the routine may determine whether the player has made a bet, such as by having pressed the "Bet One Credit" button 614 or the "Bet Max Credits" button 616, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 602 (FIG. 14A).

Control Panel Electronics

Figure 16:
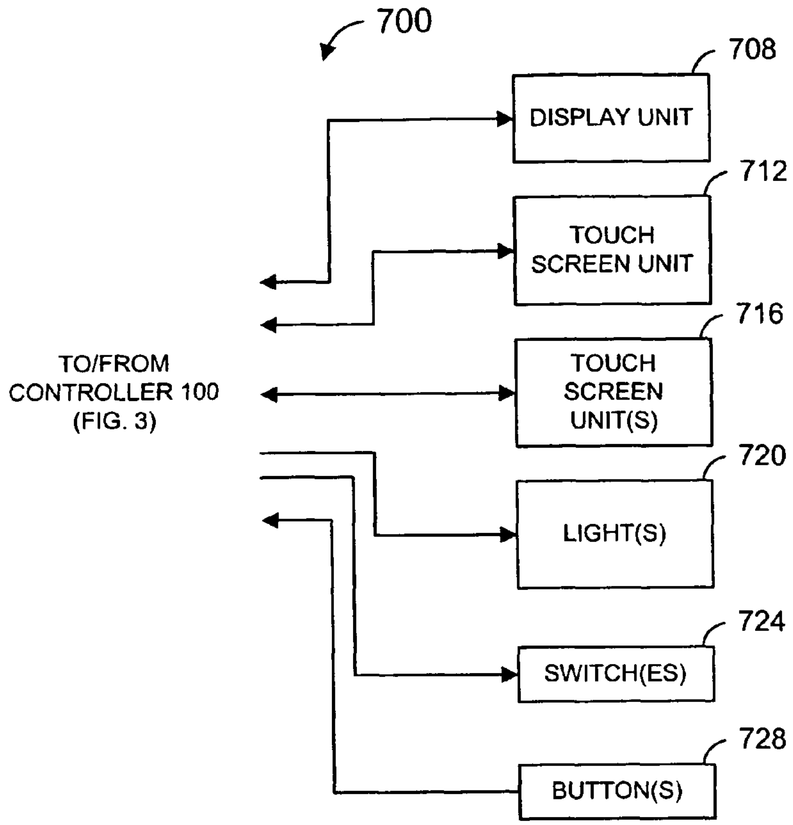
FIG. 16 is a block diagram of the electronic components of one embodiment of a configurable control panel unit.
Figure 17:
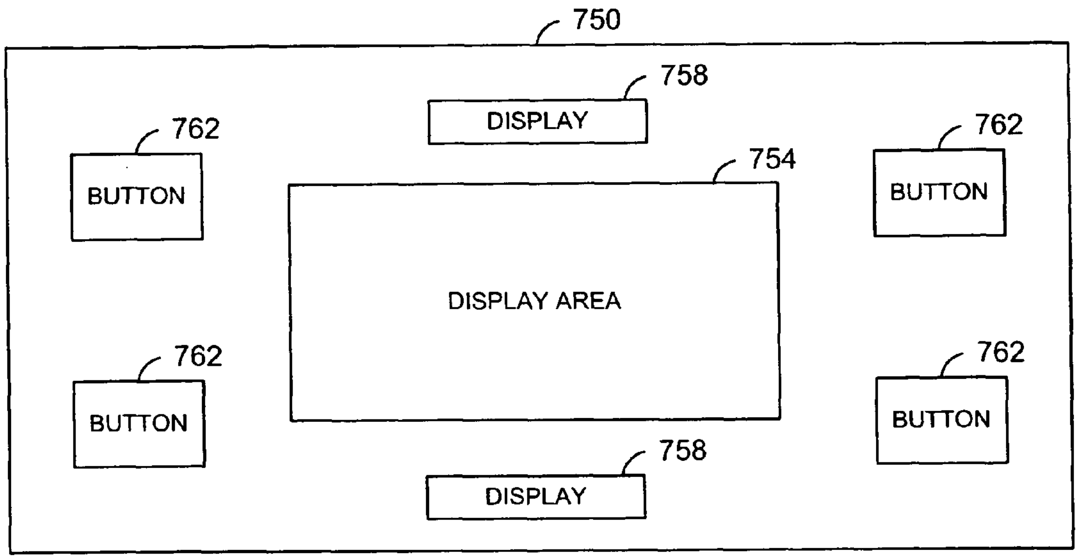
FIG. 17 is an illustration of an embodiment of a configurable control panel.

FIG. 16 is a block diagram of a number of components that may be part of a control panel unit 700, and FIG. 17 is an example control panel 750 associated with the control pane unit 700 of FIG. 16. FIG. 16 will be described with reference to FIG. 17. Referring to FIG. 16, the control panel unit 700 may include a display unit 708 that may be used to display images, video, etc., in a display area 754 of the control panel 750. The display unit 708 may include a cathode ray tube, a liquid crystal display, a plasma display, a vacuum fluorescent display, etc. The control panel unit 700 may also include a touch screen unit 712. The touch screen unit 712 may include a touch-sensitive screen that overlaps with the display area 754 and, optionally, other areas of the control panel 750. Thus, buttons 762, for example, outside of the display area 754 may be implemented using the touch screen unit 712. The touch screen unit 712 may include a capacitive touch screen device, a resistive touch screen device, a near field imaging touch screen device, etc.

The control panel unit 700 may further include one or more additional touch screen units 716. These additional touch screen units 716 may be used to implement buttons 762 outside of the display area 754 if, for example, the touch screen unit 712 is not used to implement these buttons. The control panel unit 700 may also include one or more lights 720 (e.g., fluorescent lights, light emitting diodes, numeric displays, alphanumeric displays, etc.). These lights may be used to attract players, provide informational displays, etc. For example, the lights 720 may be used to implement the displays 758 of the control panel 750.

The control panel unit 700 may further include one or more switches 724. The switches 724 may be used, for example, to implement the displays 758 of the control panel 750. For instance, switches 724 could be used to move flaps to block light, redirect light, etc., from the lights 720 to the buttons 762 and/or the displays 758. The control panel unit 700 may still further include one or more mechanical buttons 728 which can be used to implement one or more of the buttons 762, rather than using a touch screen unit 712 or 716.

FIG. 16 illustrates that the display unit 708, the touch screen unit 712, the touch screen unit(s) 716, the light(s) 720, the switch(es) 724, and the button(s) 728 may be operatively coupled to the controller 100 of FIG. 3, each of those components being so coupled by either a unidirectional or bidirectional, single-line or multiple-line data link, which may depend on the design of the component that is used. As shown in FIG. 16, the components 708, 712, 716, 720, 724, and 728 may be connected to the controller 100 via a respective direct line or conductor. Different connection schemes could be used. For example, one or more of the components shown in FIG. 16 may be connected to the controller 100 via a common bus or other data link that is shared by a number of components.

The controller 100 may cause the display unit 708 to display images, video, etc., in the display area 754. As just one example, images of buttons could be displayed in the display area 754. For instance, the controller 100 may cause the display unit 708 to generate a display such as any of the displays of FIGS. 2A, 6B, 7B, 11B, and 14B. Additionally, a player's touch within the display area 754 can be detected, and the position of the touch determined, using the touch screen unit 712. The controller 100 may cause the display areas 758 to display information to the player, flash lights to attract a player, etc. For example, a light could be made to flash during an attract sequence. As another example, a numeric display could be used display information to the player, such as a number of credits.

If the buttons 762 are to be implemented using the touch screen unit 712 or 716, the areas of the control panel 750 corresponding to the buttons 762 may be indicated by, for example, lines, words, lights, etc. For example, certain ones of the buttons 762 could be illuminated using the lights 720 and the switches 724. For example, if a button is not needed for a particular game, or for a portion of a game, the button could be de-illuminated so that a player would not see the button, so that it would be difficult to see the button, so that the button would be less noticeable, etc. In particular, certain lights 720 could be turned on or off by the controller 100 to illuminate particular buttons. Additionally, switches 724 could be used to move flaps to block light, allow light, redirect light, etc., from the lights 720 to certain ones of the buttons 762.

In one embodiment, the control panel 750 may include a darkened, transparent material such as glass, Plexiglas™, plastic, etc., that lies under one or more touch-sensitive screens. In this embodiment, the buttons 762 may be implemented via the touch-sensitive screen 712 or additional touch sensitive screens 716. In this embodiment, display area 754, display areas 758, and buttons 762 may not be noticeable to a player if not illuminated. Thus, if one of the buttons 762 is not needed for a particular game, for a particular part of a game, etc., that button could be left de-illuminated. Thus, a player may not see, or it may be more difficult for a player to see, certain ones of the buttons 762 at certain times.

Configuring the Control Panel

One manner in which one or more of the gaming units 20 (and one or more of the gaming units 30) may operate is described below in connection with a flowchart which represents a portion or routine of one or more computer programs, which may be stored in one or more of the memories of the controller 100. The computer program(s) or portion thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portion may be written in any high level language such as C, C++, C#, Java or the like or any low-level assembly or machine language. By storing the computer program portion therein, various portions of the memories of the controller 100 are physically and/or structurally configured in accordance with computer program instructions.

Figure 18:
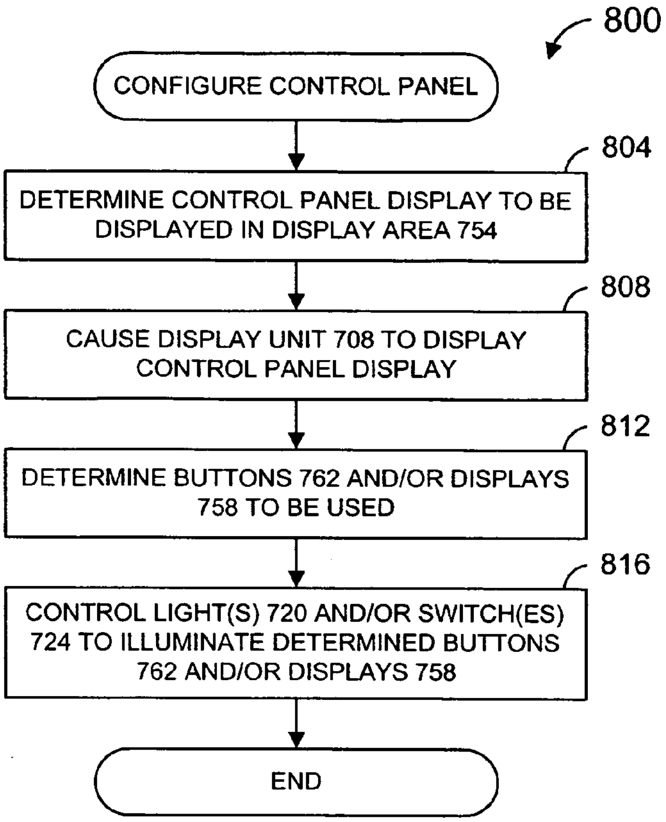
FIG. 18 is a flowchart of an embodiment of a routine that may be performed by one or more of the gaming units.

FIG. 18 is a flowchart of an example routine 800 that may be stored in the memory of the controller 100. The routine 800 will be described with reference to FIG. 17. Referring to FIG. 18, the routine 800 may begin operation at block 804 at which a control panel display to be displayed in the display area 754 may be determined. As will be discussed subsequently in more detail, the control panel display may be determined based on a number of factors including, for example, one or more of the game being played or to be played, a point within the game, a denomination of the game, player input, player tracking information, a time, etc. Determining the control panel display may include, for example, determining one or more images, a video, buttons, a background, etc., to be displayed in the display area 754.

At block 808, the controller 100 may cause the display unit 708 to display the control panel display determined at block 804.

At block 812, one or more buttons 762 and/or one or more display areas 758 to be used may be determined. The buttons 762 and/or the display areas 758 to be used may be determined based on a number of factors including, for example, one or more of the game being played or to be played, a stage of the game, a denomination of the game, player input, player tracking information, a time, etc. Determining the buttons 762 and/or the display areas 758 to be used may include, for example, determining particular lights 720 and/or switches 724 to be activated or deactivated.

At block 816, the one or more buttons 762 and/or one or more display areas 758 determined at block 812 may be illuminated. Also, other of the buttons 762 and/or display areas 758 may be de-illuminated. Illuminating/de-illuminating the buttons 762 and/or the display areas 758 may include, for example, activating or deactivating particular lights 720 and/or switches 724.

A routine such as the routine 800 may be used to reconfigure the control panel 750 in various situations. For example, a gaming unit 20 may be capable of facilitating play of a plurality of types of games such as two or more of poker, blackjack, slots, keno, and bingo. For example, a player may be able to choose one game type of the plurality of game types via a game selection display. Once the player has selected a game type, the control panel 750 may be configured to play the selected game type. For instance, the control panel 750 may be configured to implement a control panel such as one of the control panels of FIGS. 2A, 6B, 7B, 11B, or 14B.

As another example, a gaming unit 20 could be configured for play of one of the plurality of game types by an owner of the gaming unit 20, a casino operator, etc. Referring to FIG. 1, for instance, software for configuring a gaming unit 20 or 30 could be loaded to the gaming unit 20 or 30 via the network 24 or 34, or software could loaded to the to the gaming unit 20 or 30 via a memory module, disk, etc. The loaded software could include one or more appropriate control panel configurations for the game.

Figure 19A:
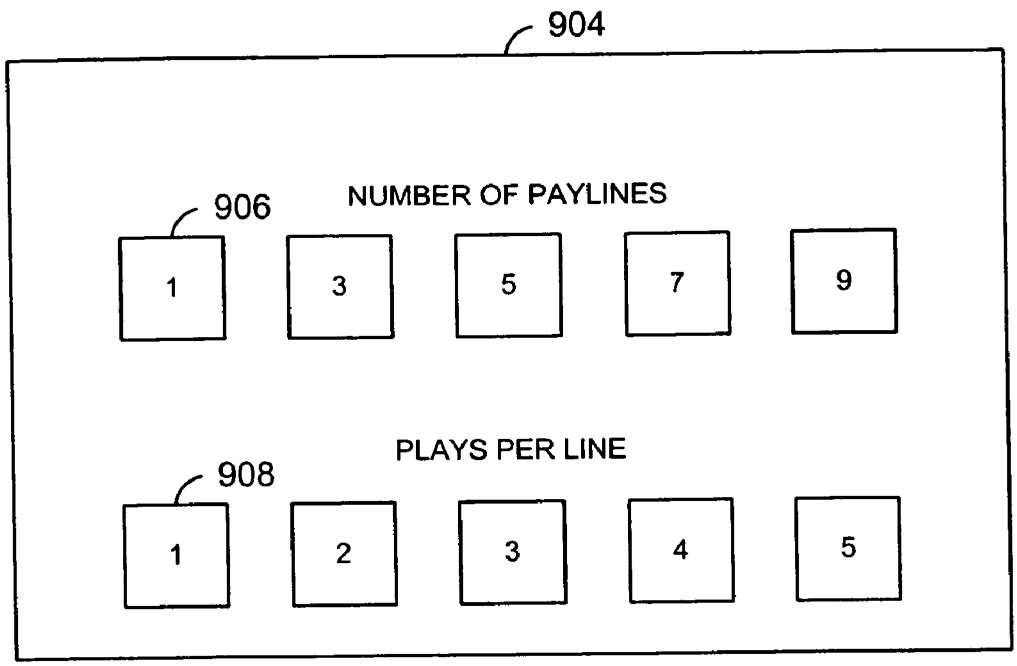
FIG. 19A is an illustration of an example player input display that may be displayed on the configurable control panel of FIG. 17.
Figure 19B:
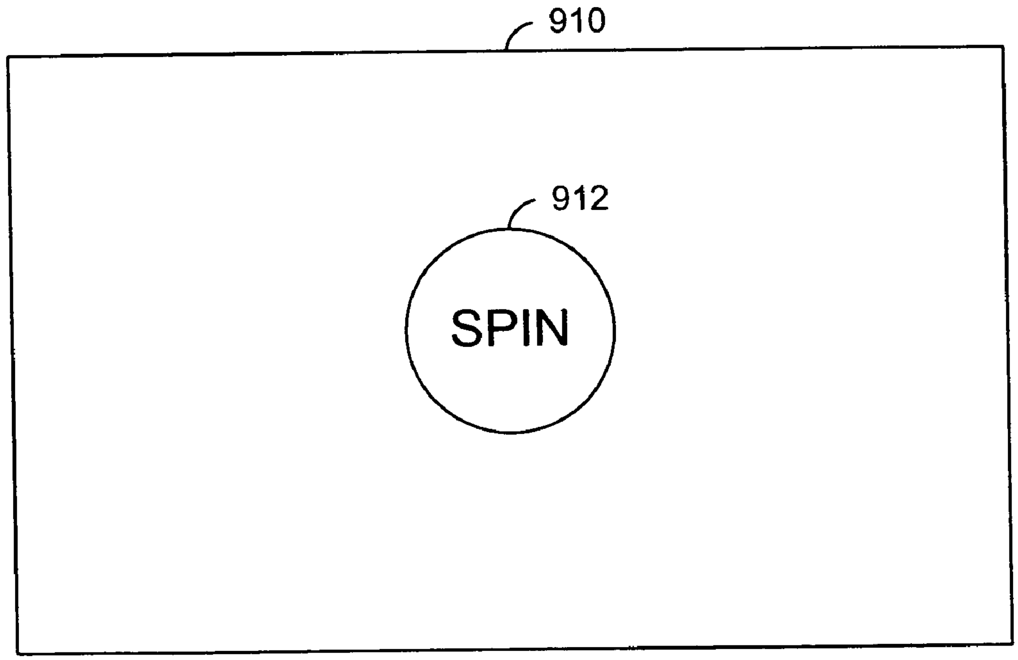
FIG. 19B is an illustration of another example player input display that may be displayed on the configurable control panel of FIG. 17.
Figure 19C:
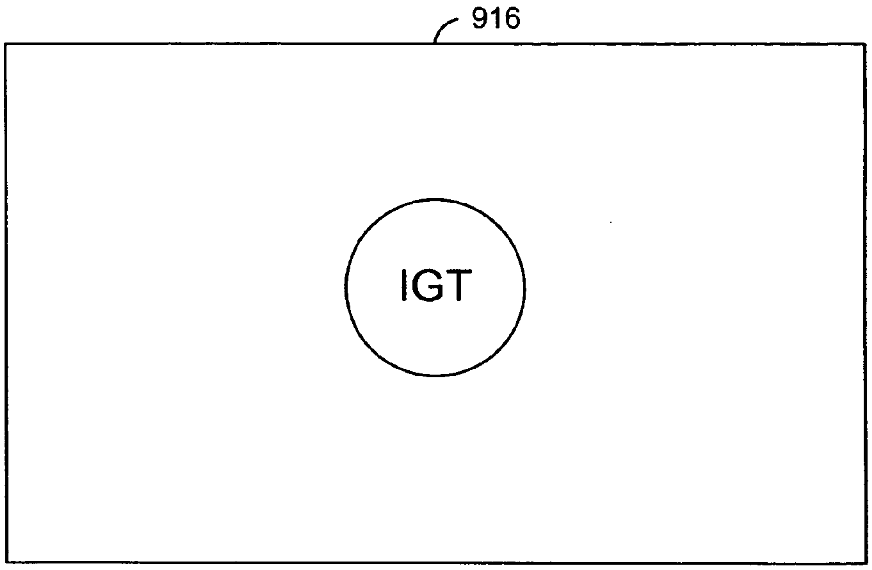
FIG. 19C is an illustration of an example display that may be displayed on the configurable control panel of FIG. 17.

A routine such as the routine 800 may be used to reconfigure the control panel 750 during play of a game, after a game has ended, when a game is to start, etc. For example, the control panel 750 may be reconfigured for different stages of the same game. FIG. 19A is an example display 904 that may be displayed in the display area 754 during a slots game. For instance, the display 904 may be displayed when a player is to choose a number of paylines and a number of plays per line. The display 904 may include a plurality of buttons 906 for choosing a number of paylines, and may include a plurality of buttons 908 for choosing a number of plays per line. After the player selects a number of paylines and a number of plays per line, a display such as the example display 910 of FIG. 19B may be displayed in the display area 754. The display 910 includes a "Spin" button 912. After the player selects the "Spin" button 912, a display such as the example display 916 of FIG. 19C may be displayed in the display area 754. The display 916 may include a company logo, for example.

As another example, the control panel 750 may be reconfigured if a player, owner, casino operator, etc., chooses to change a denomination of a game. For example, if a denomination of the game is changed, a corresponding amount of a "Max Bet" may be displayed in the display area 754, for example. If a "Max Bet" button is displayed in the display area 754, the "Max Bet" button may itself indicate the amount of the "Max Bet."

The control panel 750 may be reconfigured based on information received from a player tracking card. As just one example, information stored on a player tracking card may indicate that a preferred game of the player is $1 blackjack. After the gaming unit 20 reads the player's tracking card, the gaming unit 20 may configure itself for a $1 blackjack game. This may include appropriately configuring the control panel 750 for $1 blackjack.

As illustrated in the examples of FIGS. 6A and 6B, much or all of what is shown on the display unit 70 of the gaming unit 20 can also be displayed on the display unit 708 of the control panel unit 700. Thus, in some embodiments, the game being played by the player can be displayed on the display unit 708 while the display unit 70 can be used to display, for example, a bonus game, a tournament game, a feature event, advertisements, television shows, movies, music videos, etc. Alternatively, the display unit 708 of the control panel unit 700 can be used to display, for example, a bonus game, a tournament game, a feature event, advertisements, television shows, movies, music videos, etc.

The display unit 708 of the control panel unit 700 can be used to display various types of information to the player. For example, various statistics (e.g., winnings, credits, number of games, time on the machine, etc.) for the player could be displayed. As another example, announcements by the casino could be displayed on the display unit 708. As yet another example, a notification that an award has been awarded to the player could be displayed on the display unit 708.

The control panel 750 can also be configured to provide the player with user interfaces for various functions. For example, the control panel 750 could be configured to provide a user interface for configuring the player's player tracking card. For instance, the player could use the user interface to choose or change preferences. As another example, the control panel 750 could be configured to provide the player with a user interface for ordering drinks, food, tickets to shows, services offered by a casino, etc.

A background may be displayed on the display unit 708, and buttons may be displayed "in front of" the background. The background may be, for example, a color, an image, a video, etc. Additionally, the background may change based on, for example, one or more of a time, the game, a stage of the game, user input, etc.

In one example, the display unit 708 of the control panel unit 700 may be capable of displaying text, images, and video in color. Also, the control panel 750 may include a darkened, transparent sheet of glass, Plexiglas™, plastic, etc., under a touch screen device so that the control panel 750, including the display area 754, the display areas 758, and the buttons 762, may appear to the player as a unified panel. The control panel 750 may be water resistant so as to reduce the chance of drinks spilled on the control panel 750 damaging the gaming unit 20. In other examples, the display unit 708 may be a monochrome display unit. In still other examples, the display unit 708 may not be capable of displaying video at frame rates similar to television or movies. Also, the control panel 750 need not include a darkened sheet of glass, Plexiglas™, plastic, etc., or be water resistant.

Figure 20:
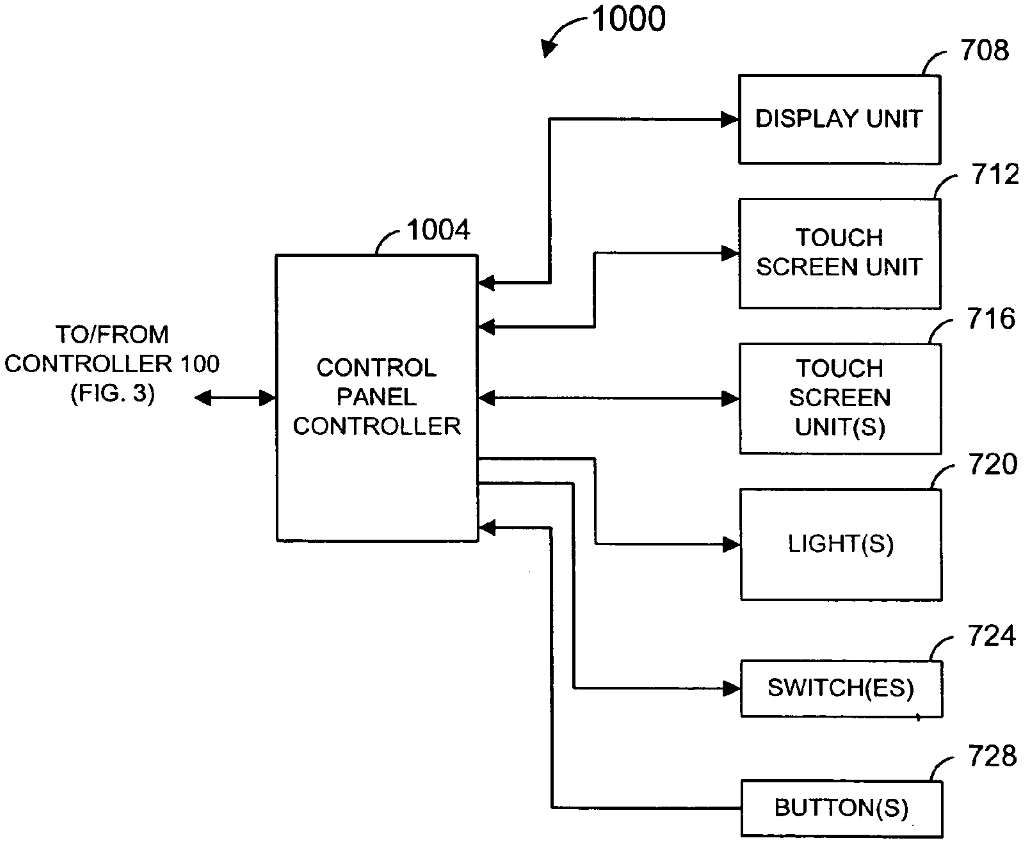
FIG. 20 is a block diagram of the electronic components of another embodiment of a configurable control panel unit.

FIG. 20 is a block diagram of another example control panel unit 1000. Referring to FIG. 20, the control panel unit 1000 may include a control panel controller 1004 that may comprise one or memories (not shown), one or more microcontrollers and/or microprocessors (not shown). The memory or memories may include one or more RAMs, ROMs. The memory or memories may be implemented as semiconductor memories, magnetically readable memories, and/or optically readable memories, for example. The control panel controller 1004 may be operatively coupled to the controller 100 of FIG. 3.

FIG. 20 illustrates that the display unit 708, the touch screen unit 712, the touch screen unit(s) 716, the light(s) 720, the switch(es) 724, and the button(s) 728 may be operatively coupled to the control panel controller 1004, each of those components being so coupled by either a unidirectional or bidirectional, single-line or multiple-line data link, which may depend on the design of the component that is used. As shown in FIG. 20, the components 708, 712, 716, 720, 724, and 728 may be connected to the control panel controller 1004 via a respective direct line or conductor. Different connection schemes could be used. For example, one or more of the components shown in FIG. 20 may be connected to the control panel controller 1004 via a common bus or other data link that is shared by a number of components. Additionally, one or more of the components 708, 712, 716, 720, 724, and 728 may be connected directly to the controller 100 of FIG. 3.

The control panel controller 1004, as prompted by the controller 100, for example, may cause the display unit 708 to display images, video, etc., in the display area 754. For instance, the control panel controller 1004 may cause the display unit 708 to generate a display such as any of the displays of FIGS. 2A, 6B, 7B, 11B, and 14B. The control panel controller 1004 may cause the display areas 758 to display information to the player, flash lights to attract a player, etc.

Certain lights 720 could be turned on or off, and certain switches 724 could be activated or deactivated by the control panel controller 1004 to illuminate particular buttons.

Figure 21:
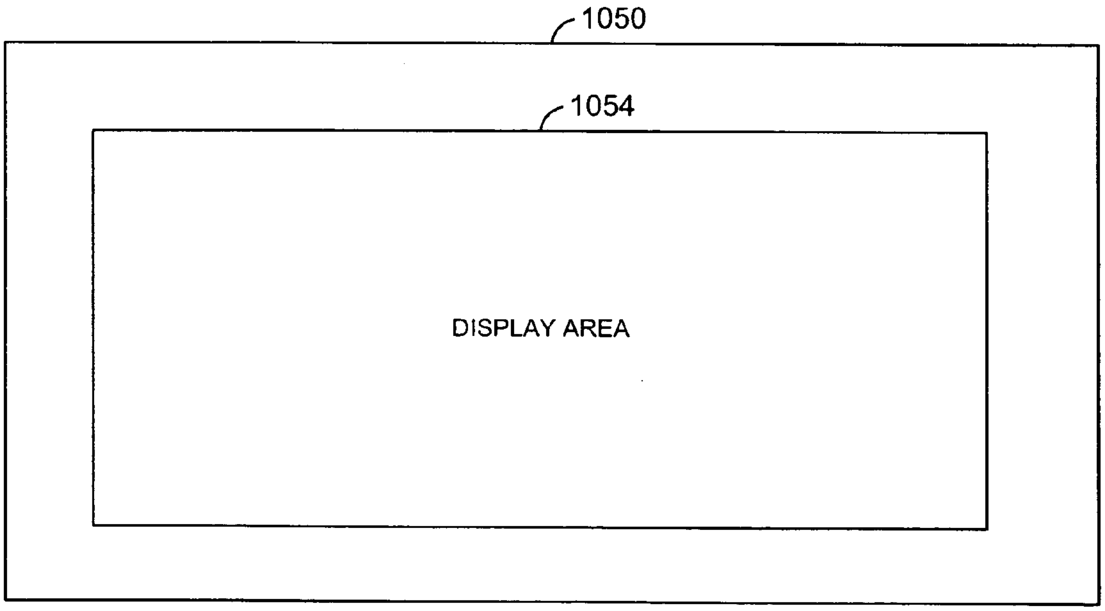
FIG. 21 is an illustration of another embodiment of a configurable control panel.

A control panel need not include buttons or displays outside of the display area associated with the display unit 708. For example, FIG. 21 is an illustration of an example display 1050 having a display area 1054 in which the display unit 708 may display text, images, video, etc. The display 1050 does not include any buttons or displays outside of the display area 1054.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a ROM, an erasable programmable ROM (EPROM), an electrically erasable programmable PROM (EEPROM), a flash memory, etc. Further, although the examples described above were described with reference to various flow diagrams, one of ordinary skill in the art will appreciate that many other methods may alternatively be used. For example, the order of execution of the blocks may be changed, additional blocks may be added, and/or some or all of the blocks may be changed, eliminated, or combined.

What is claimed is:

1. A gaming method for facilitating game play via a gaming apparatus, the gaming apparatus comprising a value input device, a first display unit, and a configurable control panel unit, the configurable control panel unit comprising a second display unit and a touch screen unit associated with the second display unit, the gaming method comprising:

receiving a value input from a player via the value input device;

causing the first display unit to display a first game display relating to one of the following games: poker, blackjack, slots, keno or bingo;

selecting one of a plurality of player input displays, the one player input display corresponding to the one game related to the first game display;

causing the second display unit to display the selected one of the plurality of player input displays;

receiving player input data associated with the selected one of the plurality of player input displays and associated with the one game via the touch screen unit;

selecting an other of a plurality of player input displays;

after causing the second display unit to display the selected one of the plurality of player input displays, causing the second display unit to display the selected other of the plurality of player input displays; and receiving player input data associated with the selected other of the plurality of player input displays via the touch screen unit; and determining a value payout associated with an outcome of the one game.

2. A gaming method according to claim 1, wherein causing the second display unit to display the selected one of the plurality of player input displays comprises causing the second display unit to display at least one button.

3. A gaming method according to claim 2, further comprising determining whether the player selected the at least one button.

4. A gaming method according to claim 2, wherein causing the second display unit to display the selected one of the plurality of player input displays comprises causing the second display unit to display a first background.

5. A gaming method according to claim 4, wherein causing the second display unit to display the first background comprises causing the second display unit to display an image.

6. A gaming method according to claim 4, wherein causing the second display unit to display the background comprises causing the second display unit to display a video.

7. A gaming method according to claim 4, wherein causing the second display unit to display the selected one of the plurality of player input displays comprises causing the second display unit to display a second background after displaying the first background.

8. A gaming method according to claim 1, further comprising causing the second display unit to display a colored image.

9. A gaming method according to claim 1, further comprising causing the second display unit to display video.

10. A gaming method according to claim 1, wherein causing the second display unit to display the selected one of the plurality of player input displays comprises causing the second display unit to display a second game display relating to the one of the following games: poker, blackjack, slots, keno or bingo, wherein the selected one of the plurality of player input displays comprises the second game display.

11. A gaming method according to claim 10, further comprising causing the first display unit to display a bonus game while causing the second display unit to display the second game display.

12. A gaming method according to claim 10, further comprising causing the first display unit to display a feature event while causing the second display unit to display the second game display.

13. A gaming method according to claim 1, wherein selecting the one of the plurality of player input displays comprises selecting the one of the plurality of player input displays based on at least one of player input, a time, a game, a stage of a game, a denomination, and player tracking information.

14. A gaming method according to claim 1, wherein the plurality of player input displays further comprises one or more user interfaces unrelated to game play and wherein causing the second display unit to display the selected one of the plurality of player input displays comprises causing the second display unit to display a user interface for configuring player tracking information.

15. A gaming method according to claim 1, wherein the plurality of player input displays further comprises one or more user interfaces unrelated to game play and wherein causing the second display unit to display the selected one of the plurality of player input displays comprises causing the second display unit to display a user interface for ordering at least one of a drink, a food item, a ticket to a show, and a service offered by a casino.

16. A gaming method according to claim 1, wherein the configurable control panel unit further comprises at least one button separate from the second display unit, the method further comprising receiving player input data via the at least one button separate from the second display unit.

17. A gaming apparatus, comprising:

a first display unit;

a value input device;

a configurable control panel unit, the configurable control panel unit comprising a second display unit, and a touch screen unit, the touch screen unit including a touch screen device associated with the second display unit, a controller operatively coupled to the first display unit, the value input device, the second display unit, and the touch screen unit, the controller comprising a processor and a memory operatively coupled to the processor, the controller being programmed to receive value input data via the value input device, the controller being programmed to cause the first display unit to generate a first game display relating to one of the following games: poker, blackjack, slots, keno or bingo, the controller being programmed to select one of a plurality of player input displays, the one player input display corresponding to the one game related to the first game display, the controller being programmed to cause the second display unit to generate the selected one of the plurality of player input displays, the controller being programmed to receive player input data associated with the selected one of the plurality of player input displays and associated with the one game via the touch screen unit the controller being programmed to determine a value payout associated with an outcome of the one game; and wherein the configurable control panel unit further comprises a panel and a plurality of lights located beneath the panel to selectively illuminate external portions of the panel corresponding to button areas on the panel, wherein the second display unit is located beneath the panel, and wherein the touch screen device is associated with the button areas;

wherein the controller is further programmed to:

cause button areas on the panel corresponding to the selected one of the plurality of player input displays, if any, to be illuminated, cause button areas on the panel not corresponding to the selected one of the plurality of player input displays, if any, to be de-illuminated, and receive player input data associated with the button areas on the panel corresponding to the selected one of the plurality of player input displays via the touch screen unit.

18. A gaming apparatus according to claim 17, wherein the controller is programmed to cause the secondary display unit to display at least one button.

19. A gaming apparatus according to claim 18, wherein the controller is programmed to determine if the player selected the at least one button.

20. A gaming apparatus according to claim 18, wherein the controller is programmed to cause the secondary display unit to display a first background to the at least one button.

21. A gaming apparatus according to claim 20, wherein the controller is programmed to cause the second display unit to display a second background after displaying the first background.

22. A gaming apparatus according to claim 17, wherein the controller is programmed to cause the second display unit to display a color image.

23. A gaming apparatus according to claim 17, wherein the controller is programmed to cause the second display unit to display video.

24. A gaming apparatus according to claim 17, wherein the controller is programmed to cause the second display unit to display a second game display relating to the one of the following games: poker, blackjack, slots, keno or bingo.

25. A gaming apparatus according to claim 24, wherein the selected one of the plurality of player input displays comprises the second game display.

26. A gaming apparatus according to claim 24, wherein the controller is programmed to cause the first display unit to display a bonus game while causing the second display unit to display the second game display.

27. A gaming apparatus according to claim 24, wherein the controller is programmed to cause the first display unit to display a feature event while causing the second display unit to display the second game display.

28. A gaming apparatus according to claim 17, wherein the controller is programmed to select the one of the plurality of player input displays based on at least one of player input data, a time, a game, a stage of a game, a denomination, and player tracking information.

29. A gaming apparatus according to claim 17, wherein the plurality of player input displays further comprises one or more user interfaces unrelated to game play and wherein the controller is programmed to cause the second display unit to display a user interface for configuring player tracking information.

30. A gaming apparatus according to claim 17, wherein the plurality of player input displays further comprises one or more user interfaces unrelated to game play and wherein the controller is programmed to cause the second display unit to display a user interface for ordering at least one of a drink, a food item, a ticket to a show, and a service offered by a casino.

31. A gaming apparatus according to claim 17, wherein the configurable control panel unit further comprises a user input device separate from the plurality of player input displays; and wherein the controller is programmed to receive player input data via the user input device separate from the plurality of player input displays.

32. A gaming method for facilitating game play via a gaming apparatus, the gaming apparatus comprising a value input device, a first display unit, and a configurable control panel unit, the configurable control panel unit comprising a second display unit and a touch screen unit associated with the second display unit, the gaming method comprising:

receiving a value input from a player via the value input device;

causing the first display unit to display a first game display relating to one of the following games: poker, blackjack, slots, keno or bingo;

causing the second display unit to display a first player input display, the first player input display comprising a first plurality of buttons associated with the one game related to the first game display;

receiving player input data associated with the first plurality of buttons via the touch screen unit; and determining a value payout associated with an outcome of the one game.

33. A gaming method according to claim 32, further comprising determining whether the player selected one of the buttons in the first plurality of buttons.

34. A gaming method according to claim 32, wherein causing the second display unit to display the first player input display comprises causing the second display unit to display a first background.

35. A gaming method according to claim 34, wherein causing the second display unit to display the first player input display comprises causing the second display unit to display a second background after displaying the first background.

36. A gaming method according to claim 32, further comprising causing the second display unit to display a colored image.

37. A gaming method according to claim 32, further comprising causing the second display unit to display video.

38. A gaming method according to claim 32, wherein causing the second display unit to display the first player input display comprises causing the second display unit to display a second game display relating to the one of the following games: poker, blackjack, slots, keno or bingo, wherein the first player input display comprises the second game display.

39. A gaming method according to claim 38, further comprising causing the first display unit to display a bonus game while causing the second display unit to display the second game display.

40. A gaming method according to claim 38, further comprising causing the first display unit to display a feature event while causing the second display unit to display the second game display.

41. A gaming method according to claim 32, further comprising:

causing the second display unit to display a second player input display after causing the second display unit to display the first player input display, wherein the second player input display comprises at least a second button; and receiving player input data associated with the at least a second button via the touch screen unit.

42. A gaming method according to claim 32, wherein causing the second display unit to display the first player input display comprises causing the second display unit to display a user interface for configuring player tracking information.

43. A gaming method according to claim 32, wherein causing the second display unit to display the first player input display comprises causing the second display unit to display a user interface for ordering at least one of a drink, a food item, a ticket to a show, and a service offered by a casino.

44. A gaming method according to claim 32, wherein the configurable control panel unit further comprises at least one button separate from the second display unit, the method further comprising receiving player input data via the at least one button separate from the second display unit.

45. A gaming apparatus, comprising: a first display unit;

a value input device;

a configurable control panel unit, the configurable control panel unit comprising a second display unit, and a touch screen unit, the touch screen unit including a touch screen device associated with the second display unit, a controller operatively coupled to the first display unit, the value input device, the second display unit, and the touch screen unit, the controller comprising a processor and a memory operatively coupled to the processor, the controller being programmed to receive value input data via the value input device, the controller being programmed to cause the first display unit to generate a first game display relating to one of the following games: poker, blackjack, slots, keno or bingo, the controller being programmed to cause the second display unit to generate a first player input display, the first player input display comprising a first plurality of buttons, associated with the one game related to the first game display, the controller being programmed to receive player input data associated with the first plurality of buttons via the touch screen unit, and the controller being programmed to determine a value payout associated with an outcome of the one game.

46. A gaming apparatus according to claim 45, wherein the controller is programmed to determine whether the player selected one of the buttons in the first plurality of buttons.

47. A gaming apparatus according to claim 45, wherein the controller is programmed to cause the second display unit to display a colored image.

48. A gaming apparatus according to claim 45, wherein the controller is programmed to cause the second display unit to display video.

49. A gaming apparatus according to claim 45, wherein the controller is programmed to cause the second display unit to display a second game display relating to the one of the following games: poker, blackjack, slots, keno or bingo, wherein the first player input display comprises the second game display.

50. A gaming apparatus according to claim 45, wherein the controller is programmed to cause the second display unit to display a second player input display after causing the second display unit to display the first player input display, wherein the second player input display comprises at least a second button; and wherein the controller is programmed to receive player input data associated with the at least a second button via the touch screen unit.

51. A gaming apparatus according to claim 45, wherein the configurable control panel unit further comprises a user input device separate from the second display unit; and wherein the controller is programmed to receive player input data via the user input device separate from the second display unit.

52. A gaming method according to claim 1, wherein the configurable control panel unit further comprises a panel and a plurality of lights located beneath the panel to selectively illuminate external portions of the panel corresponding to button areas on the panel, wherein the second display unit is located beneath the panel, the method further comprising:

causing button areas on the panel corresponding to the selected one of the plurality of player input displays, if any, to be illuminated;

causing button areas on the panel not corresponding to the selected one of the plurality of player input displays, if any, to be de-illuminated; and receiving player input data associated with the button areas on the panel corresponding to the selected one of the plurality of player input displays via the touch screen unit.

53. A gaming method according to claim 52, wherein the touch screen unit comprises a plurality of touch screen units, wherein one of the touch screen units of the plurality of touch screen units corresponds to the second display unit, and wherein another touch screen unit of the plurality of touch screen units corresponds to the button areas on the panel.

54. A gaming method according to claim 52, wherein the configurable control panel unit further comprises a plurality of switches including switches to affect illumination of the button areas; and wherein causing button areas to be illuminated comprises controlling switches in the plurality of switches.

55. A gaming method according to claim 54, wherein the plurality of switches includes switches to affect de-illumination of the button areas; and wherein causing button areas to be de-illuminated comprises controlling switches in the plurality of switches.

56. A gaming method according to claim 1, further comprising:

selecting an other of a plurality of player input displays;

after causing the second display unit to display the selected one of the plurality of player input displays, causing the second display unit to display the selected other of the plurality of player input displays; and receiving player input data associated with the selected other of the plurality of player input displays via the touch screen unit.

57. A gaming method according to claim 56, wherein the one game display is associated with one of the following games: poker, blackjack, slots, keno or bingo, wherein the selected one of the plurality of player input displays comprises the second game display; and wherein the other game display is associated with a different one of the following games: poker, blackjack, slots, keno or bingo, wherein the selected one of the plurality of player input displays comprises the second game display.

58. A gaming method according to claim 56, wherein the one game display comprises a first plurality of buttons; and wherein the other game display comprises a second plurality of buttons.

59. A gaming apparatus according to claim 17, wherein the configurable control panel unit further comprises a panel and a plurality of lights located beneath the panel to selectively illuminate external portions of the panel corresponding to button areas on the panel, wherein the second display unit is located beneath the panel, and wherein the touch screen device is associated with the button areas;

wherein the controller is further programmed to:

cause button areas on the panel corresponding to the selected one of the plurality of player input displays, if any, to be illuminated, cause button areas on the panel not corresponding to the selected one of the plurality of player input displays, if any, to be de-illuminated, and receive player input data associated with the button areas on the panel corresponding to the selected one of the plurality of player input displays via the touch screen unit.

60. A gaming apparatus according to claim 59, wherein the touch screen device comprises a plurality of touch screen devices, wherein one of the touch screen devices of the plurality of touch screen devices corresponds to the second display unit, and wherein at least one other touch screen device of the plurality of touch screen devices corresponds to the button areas on the panel.

61. A gaming apparatus according to claim 60, wherein the touch screen unit comprises a plurality of touch screen units, wherein one of the touch screen units of the plurality of touch screen units corresponds to the second display unit, and wherein another touch screen unit of the plurality of touch screen units corresponds to the button areas on the panel.

62. A gaming apparatus according to claim 59, wherein the configurable control panel unit further comprises a plurality of switches including switches to affect illumination of the button areas; and wherein the controller is further programmed to control switches in the plurality of switches in causing button areas to be illuminated.

63. A gaming apparatus according to claim 62, wherein the plurality of switches includes switches to affect de-illumination of the button areas; and wherein the controller is further programmed to control switches in the plurality of switches in causing button areas to be de-illuminated.

64. A gaming apparatus according to claim 17, wherein the controller is further programmed to:

select an other of a plurality of player input displays, after causing the second display unit to display the selected one of the plurality of player input displays, cause the second display unit to display the selected other of the plurality of player input displays, and receive player input data associated with the selected other of the plurality of player input displays via the touch screen unit.

65. A gaming apparatus according to claim 64, wherein the one game display is associated with one of the following games: poker, blackjack, slots, keno or bingo, wherein the selected one of the plurality of player input displays comprises the second game display; and wherein the other game display is associated with a different one of the following games: poker, blackjack, slots, keno or bingo, wherein the selected one of the plurality of player input displays comprises the second game display.

66. A gaming apparatus according to claim 64, wherein the one game display comprises a first plurality of buttons; and wherein the other game display comprises a second plurality of buttons.

67. A gaming method according to claim 32, wherein the configurable control panel unit further comprises a panel and a plurality of lights located beneath the panel to selectively illuminate external portions of the panel corresponding to button areas on the panel, wherein the second display unit is located beneath the panel, the method further comprising:

causing button areas on the panel corresponding to the selected one of the plurality of player input displays, if any, to be illuminated;

causing button areas on the panel not corresponding to the selected one of the plurality of player input displays, if any, to be de-illuminated; and receiving player input data associated with the button areas on the panel corresponding to the selected one of the plurality of player input displays via the touch screen unit.

68. A gaming apparatus according to claim 45, wherein the configurable control panel unit further comprises a panel and a plurality of lights located beneath the panel to selectively illuminate external portions of the panel corresponding to button areas on the panel, wherein the second display unit is located beneath the panel, and wherein the touch screen device is associated with the button areas;

wherein the controller is further programmed to:

cause button areas on the panel corresponding to the selected one of the plurality of player input displays, if any, to be illuminated, cause button areas on the panel not corresponding to the selected one of the plurality of player input displays, if any, to be de-illuminated, and receive player input data associated with the button areas on the panel corresponding to the selected one of the plurality of player input displays via the touch screen unit.

* * * * *